United States Patent [19]
Burrows et al.
[11] 3,749,891
[45] July 31, 1973

[54] SAMPLED DATA CONTROL

[75] Inventors: Philip Richard Miles Burrows; Svein Hem; Michael Peter Alwyn Terry, all of Kent, England

[73] Assignee: Reed International Limited, London, England

[22] Filed: Dec. 8, 1971

[21] Appl. No.: 206,049

[30] Foreign Application Priority Data

Dec. 11, 1970 Great Britain .................. 59,064/70

[52] U.S. Cl. ................ 235/150.1, 318/636, 328/151
[51] Int. Cl. .......................................... G05b 21/02
[58] Field of Search ..................... 318/636; 328/151; 235/150.1 A, 150.1, 150.1 R, 151.1, 181

[56] References Cited

UNITED STATES PATENTS 3,436,636 4/1969 James ............................ 318/636 X
3,490,691 1/1970 Uyetani et al. ................ 328/151 X

*Primary Examiner*—Eugene G. Botz

[57] ABSTRACT

A sampled data controller responsive to a derived error signal which sums the error signal with a feedback signal. A sample buffer store is arranged in response to a sampling command to sample and hold the combined error and feedback signal. A plurality of serially-connected memory stages are connected to receive the output of the sample buffer store. The feedback signal is obtained from the output of the memory stages. The outputs of each memory stage and that of the buffer store are summed to derive a signal for adjusting a variable.

20 Claims, 17 Drawing Figures

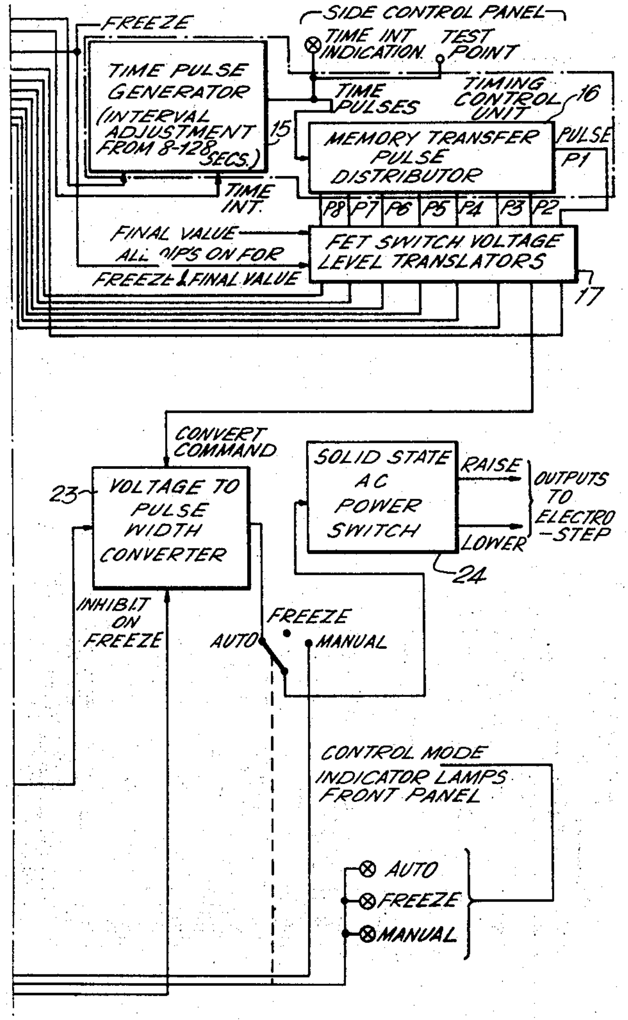
FREEZE
SIDE CONTROL PANEL
TIME INT INDICATION
TEST POINT
TIME PULSE GENERATOR (INTERVAL ADJUSTMENT FROM 8-128 SECS.)
15
TIME PULSES
TIMING CONTROL UNIT
16
MEMORY TRANSFER PULSE DISTRIBUTOR
PULSE
P1
TIME INT.
P8 P7 P6 P5 P4 P3 P2
FINAL VALUE
ALL DIPS ON FOR
FREEZE & FINAL VALUE
FET SWITCH VOLTAGE LEVEL TRANSLATORS
17
CONVERT COMMAND
23
VOLTAGE TO PULSE WIDTH CONVERTER
SOLID STATE AC POWER SWITCH
RAISE
LOWER
OUTPUTS TO ELECTRO-STEP
24
INHIBIT ON FREEZE
FREEZE
AUTO
MANUAL
CONTROL MODE INDICATOR LAMPS FRONT PANEL
AUTO
FREEZE
MANUAL United States Patent [19]
Burrows et al.
[11] 3,749,891
[45] July 31, 1973
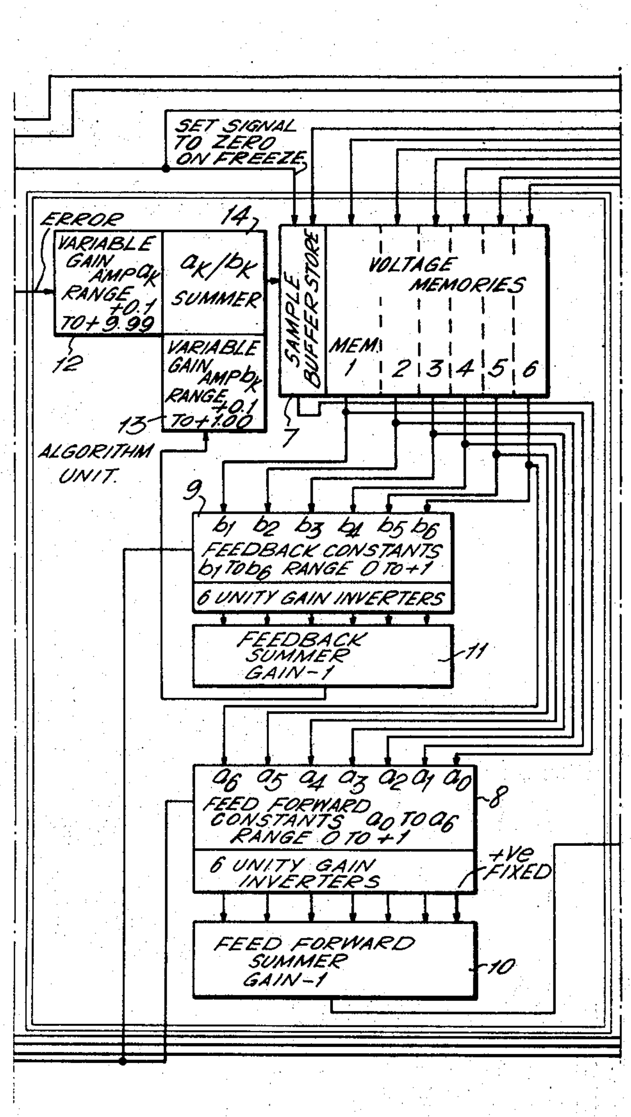

SIGNAL AMPLIFIERS & BURST DETECTORS (SIGNAL CONDITIONING & FILTERING UNIT)

PATENTED JUL 31 1973

3,749,891

SHEET 05 OF 17

ANALOGUE FILTER (SIGNAL CONDITIONING & FILTERING UNIT).

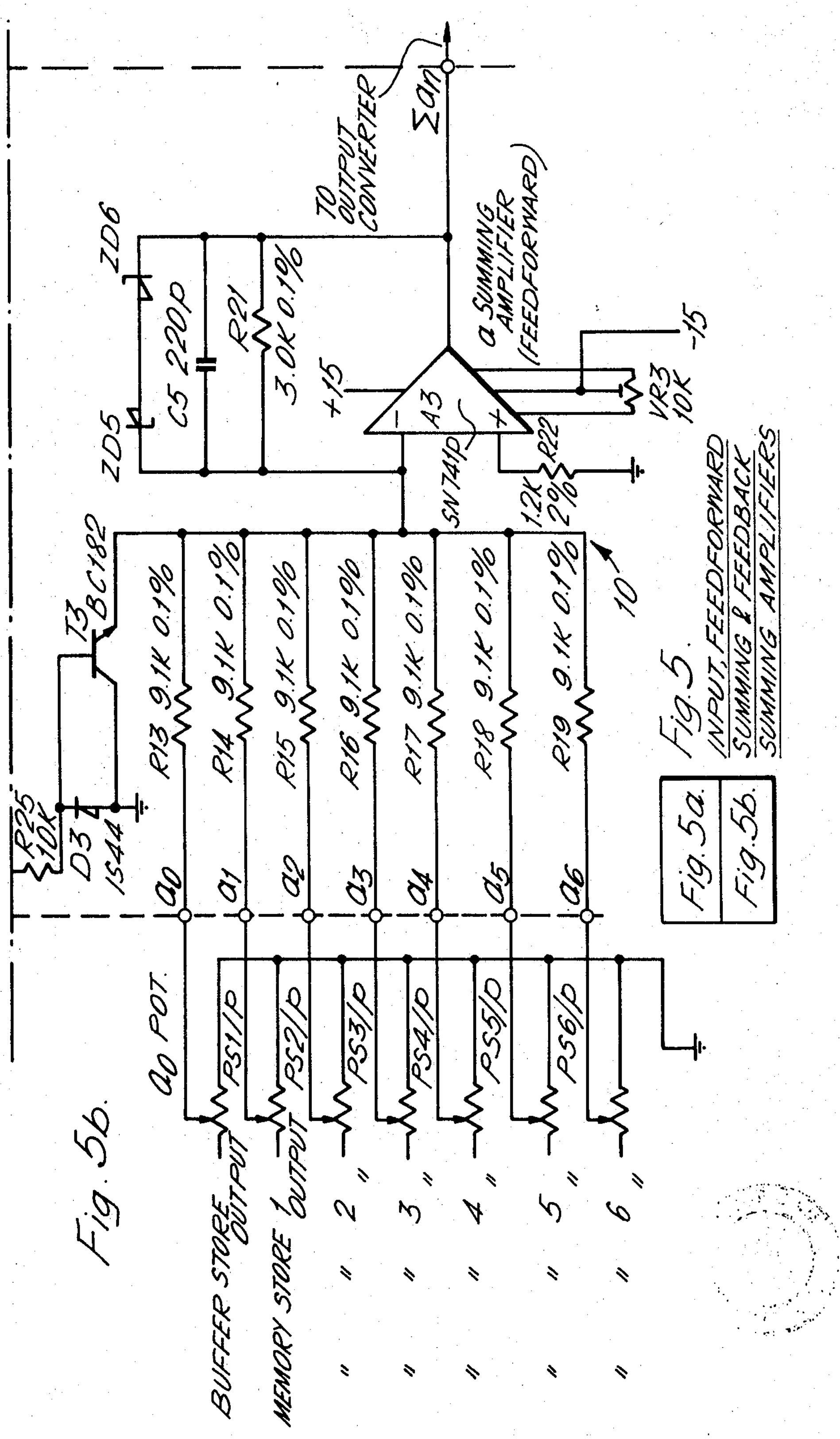
Fig. 5b. Fig. 5. INPUT, FEEDFORWARD SUMMING & FEEDBACK SUMMING AMPLIFIERS

SAMPLE BUFFER STORE

VOLTAGE MEMORY STORE.

SAMPLED DATA CONTROL

BACKGROUND OF THE INVENTION

This invention concerns improvements in control systems and in particular is concerned with systems for controlling variables that are contaminated with noise of a known spectral density and/or these which exhibit an appreciable transport delay in their response to control signals. Examples of such variables are widespread amongst process industries: two important examples are the so-called basis weight and the moisture content in papermaking processes, where, in controlling the basis weight or moisture content of paper formed upon a papermaking machine, the problem arises that an appreciable time delay occurs between the carrying out of a control action to vary the consistency and make-up of the basic raw material or to vary the amount of moisture extracted in the process and the appearance of a change in the basis weight or moisture content of paper formed on the machine as a result of the control action. The above are mentioned by way of example only and the invention is by no means restricted in its application to these examples.

Conventional P.I.D. (Proportional/Integral/Differential) analogue controllers are not suitable for the control of such variables whose response to control action differs significantly from first or second order since they can only be tuned up to give very sluggish control, any further tuning of the controller resulting in oscillation of the controlled variable. Control can be effected by utilizing a so-called kick-and-drift technique in which control actions are taken only at such time intervals as to allow the effect of any control action to become apparent in the controlled variable before taking the next control action, but such as technique gives significant advantages only in systems where the effects of long-term drifts of the variable predominate which is not the case in regard to the previously-mentioned basis weight or moisture content of paper in a papermaking process. The alternative to such control methods is to employ so-called sampled data control which is somewhat akin to the abovementioned kick-and-drift technique but in which control action is taken at more frequent intervals, the variable under control being sampled a number of times between successive control actions and the sampled values being stored in a memory system and being taken into account in computing the currently-required control action : to date, sampled data control of a variable exhibiting a complex response to control action has been practicable only by use of a digital computer to perform the storage and computation functions required. Since even the smallest commercially available digital computer has a capacity far greater than that required for effecting sampled data control of one variable, a digital computer is practicable only where its spare capacity can be put to use, for example by multiplexing the computer to a large number of control loops. It has proven totally uneconomical to use a digital computer for controlling single variables despite the significant advantage of sampled data control over other control techniques.

The object of the present invention is to provide an electrical controller designed to overcome the abovementioned problems of controlling variables whose response to a control action is complex and/or delayed.

The controller according to the invention takes advantage of the fact thay any sampled data single-input, single-output control algorithm can be expressed mathematically in the form $$D(z) = \frac{E_0(z)}{E_i(z)} = \frac{\sum_{j=0}^{j=n} a_j \cdot z^{-j}}{1 + \sum_{j=1}^{j=n} b_j \cdot z^{-j}}$$

which, when expanded, gives an expression $$D(z) = (a_o \pm a_1 z^{-1} \pm a_2 z^{-2} \ldots \pm a_n Z^{-n})/(1 \pm b_1 z^{-1} b_2 z^{-2} \pm \ldots \pm b_n 1^{-n})$$

where $a_0, a_1 \ldots a_n$ and $b_1 \ldots b_n$ are constants, $Z^{-1}$ is the $z$-transform operator of delays, and $E_o(z)$ and $E_i(z)$ are the controller output and input respectively.

One preferred controller according to the invention which is described fully hereafter incorporates an algorithm unit designed to realize the expanded polynominal expression detail above, the algorithm unit including a plurality of serially-connected analogue sample-and-hold stages each designed to perform a zero-order hold function (i.e., $z^{-1}$): the output of each stage is connected to the input of the succeeding stage in the manner of an analogue shift register, and also is connected through an "a" constants multiplier to one input of a multi-input feedforward summing amplifier the output of which constitutes the output of the algorithm unit and through a "b" constants multiplier to one input of a multi-input feedback summing amplifier the output of which is fed back to the input of the algorithm unit where it is summed with the input. A sample buffer store is provided between the input and the first of the sample-and-hold stages and its output, as well as being connected to the input of the first sample-and-hold stage, is connected through an $a_0$ constant multiplier to one input of the feedforward summing amplifier. For the sake of explanation, consider the simple case of a system whose transfer function is defined by the expression $$D(z) = E_o(z)/E_i(z) = a_o /(1 \pm b_1 z^{-1})$$

the algorithm unit for such a system would include one sample-and-hold stage only, one sample-and-hold stage being provided for each order of $z$, and the output of the single stage would be coupled through a $b_1$ multiplier to one input of a summing amplifier, to the other input of which was connected the input signal $E_i(z)$ and the output of which was connected via a buffer amplifier to the input of the sample-and-hold stage. Since $a_1$ is zero in the simple system under consideration, the system output is taken from the buffer amplifier output via an $a_o$ multiplier. With such an arrangement, an input signal $E_i(z)$ produces an output $E_o(z)$ from the $a_o$ multiplier, so the input to the $a_o$ multiplier (i.e., the output of the buffer and the input to the sample-and-hold stage) must be $E_o(z)/a_o$. The sample-and-hold stage thus produces an output $E_o(z)z^{-1}/a_o$ which is fed to the $b_1$ multiplier to produce a signal $b_1E_o(z)z^{-1}/a_o$ which in turn is fed back to the input of the system and added to the input signal $E_i(z)$. At the buffer amplifier therefore a signal of $E_i(z) \pm b_1E_o(z)2^{-1}/a_o$ produces an output $E_o(z)/a_o$ so that $$E_i(z) \pm b_1 Eo(z) z^{-1}/a_o = E_o(z)/a_o$$

which is equivalent to $$Eo(z)/E_i(z) = a_o(1 \pm b_1 z^{-1})$$

Thus with a relatively small amount of circuitry, the transfer function of a simple system can be realized. For more complex systems, it is necessary only to add another sample-and-hold stage together with associated feedback and feedforward loops for each higher order of $z$. In use of the controller, information pertaining to the deviation of a variable from a desired value is sampled, the deviation being stored first in the sample buffer store and subsequently being passed in succession along the chain of sample-and-hold circuits in each subsequent sampling interval, and for each sampling interval the algorithm unit produces an output signal indicative of the control action necessary during the following sampling interval : as will be appreciated, the operation of the algorithm unit to suit a particular problem, e.g., the control of basis weight or moisture content in the papermaking process, is dependent upon judicious selection of the constants $a_o, a_1, a_2 \ldots a_n$ and $b_1, b_2 \ldots b_n$.

Ancillary to the algorithm unit in the controller, is a timing control unit for performing digital control functions, such as control of the transfer of stored data from one sample-and-hold stage to the succeeding serially-connected stage, and for generating sampling pulses. The timing control unit preferably is such as to enable the sampling interval to be varied continuously within a predetermined range. Other functions of the timing control unit will become apparent from the detailed description appearing hereinafter. Other ancillary parts of the controller are signal input units including a signal conditioning unit which includes a signal filtering unit; a preferred feature of the signal conditioning unit is the facility that excursions of the input signal outside of normal operating limits, such as might accompany a paper break in a papermaking process where basis weight or moisture content is being controlled, are recognished and cause the controller to enter a so-called FREEZE mode in which no output change demands are made on the controller and the various signals circulating in the algorithm unit are all set to zero; a preferred feature of the signal filtering unit is the facility that the cut-off frequency of the filter is related to and can be changed with the sampling interval of the controller. The controller also has provision for manual override and set point adjustment, and incorporated an output converter adapted to convert the analogue signal output of the algorithm unit into a pulse width modulated signal for driving conventional control members.

While the controller above-described incorporates an analogue algorithm unit and the invention will hereinafter be particularly described with reference to an analogue controller, it will be appreciated that the invention is not limited to analogue controllers and can be constructed in digitally-operating form. It is considered that one skilled in the art could readily construct a digitally operating version of the hereinafter described analogue controller without the need for further instruction.

The accompanying drawings illustrate a presently preferred form of sampled data controller, and in the following description the construction and mode of operation of the controller will be explained first by reference to an overall block diagram of the controller and then by reference to detailed circuit diagrams. In the drawings FIGS. *a*, 1*b* and 1*c* shows an overall block diagram of the sampled data controller;

Figures 1, 1A:
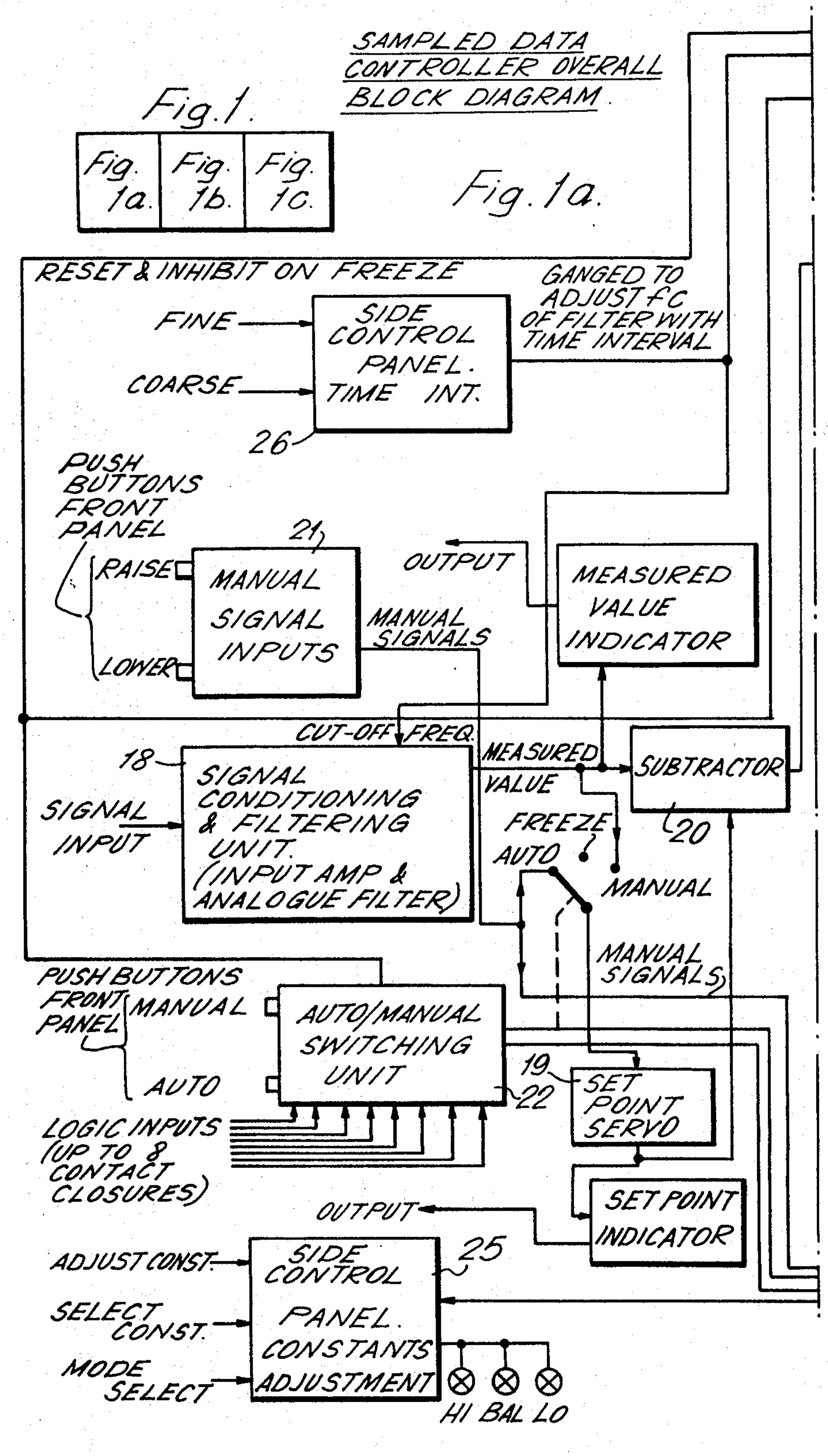
Figure 1B:
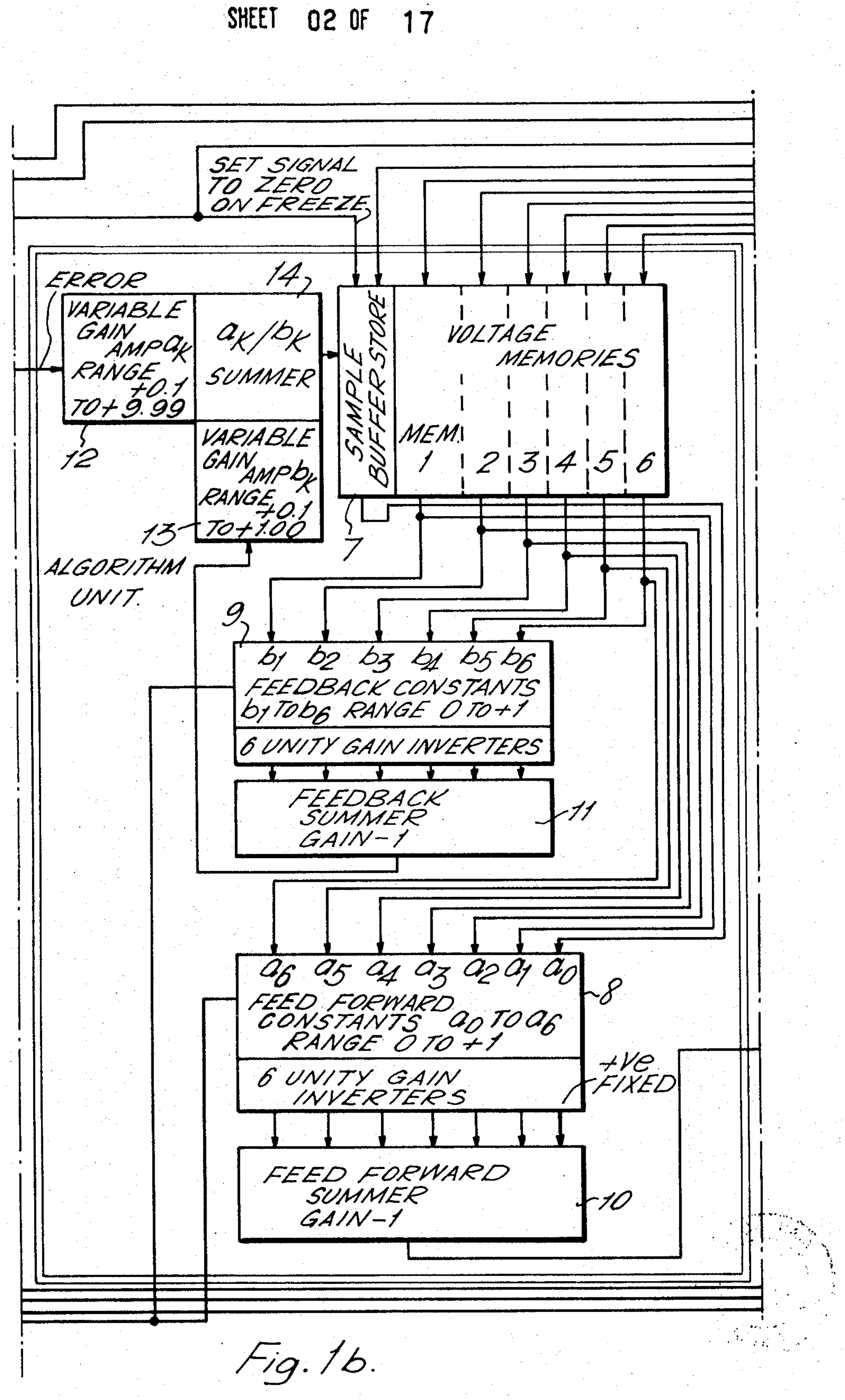
Figure 1C:
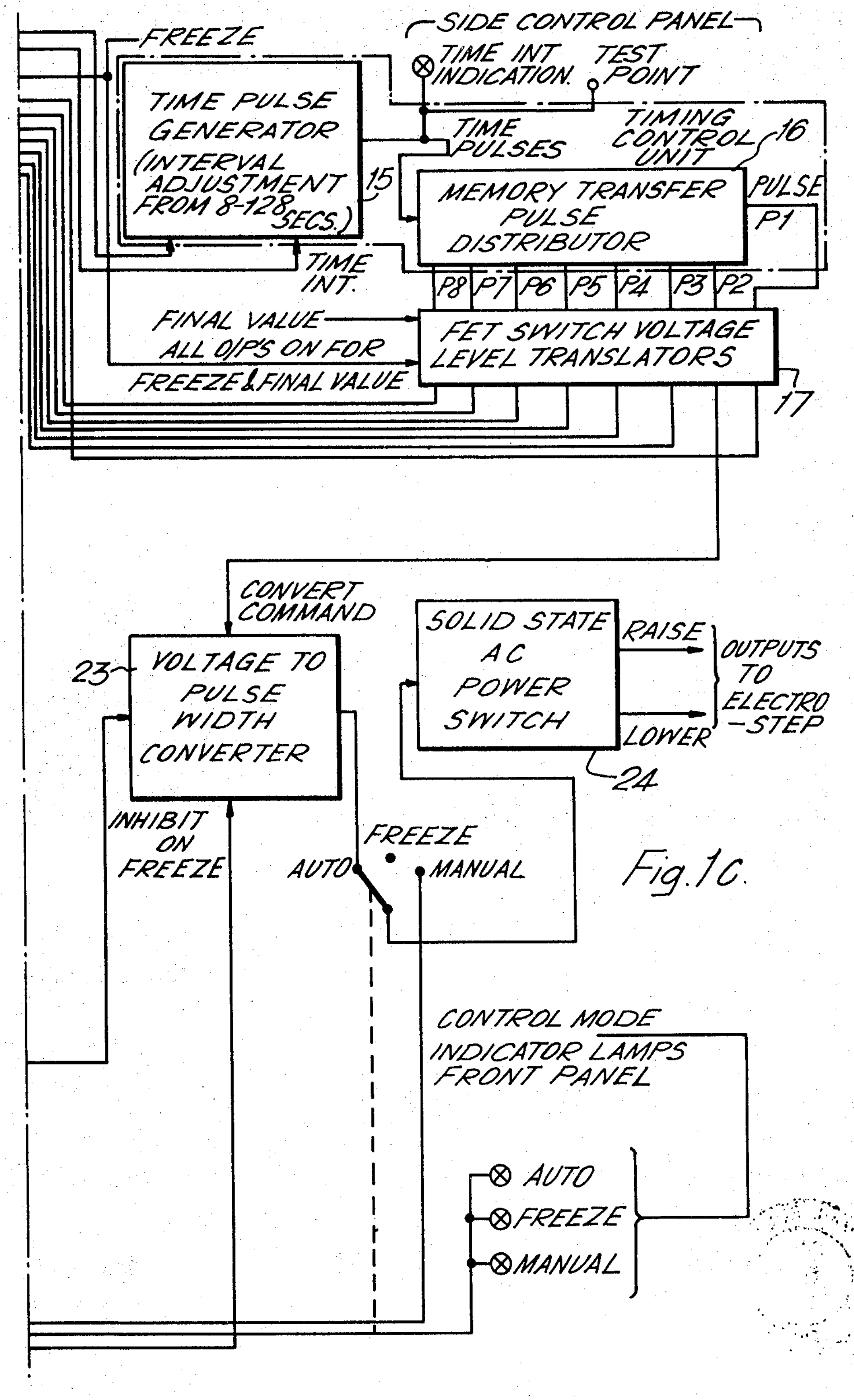
Figure 5A:
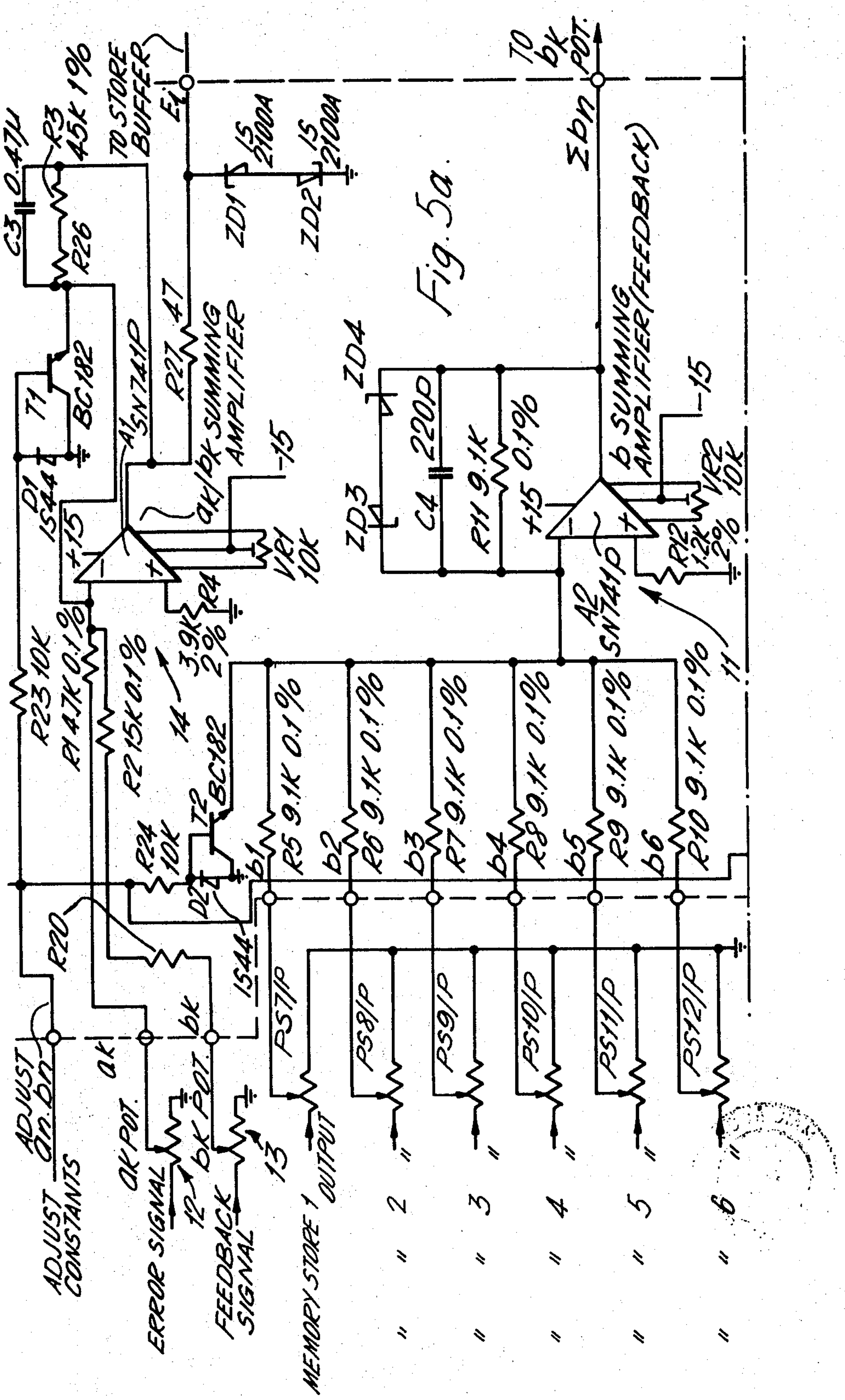
Figure 6:
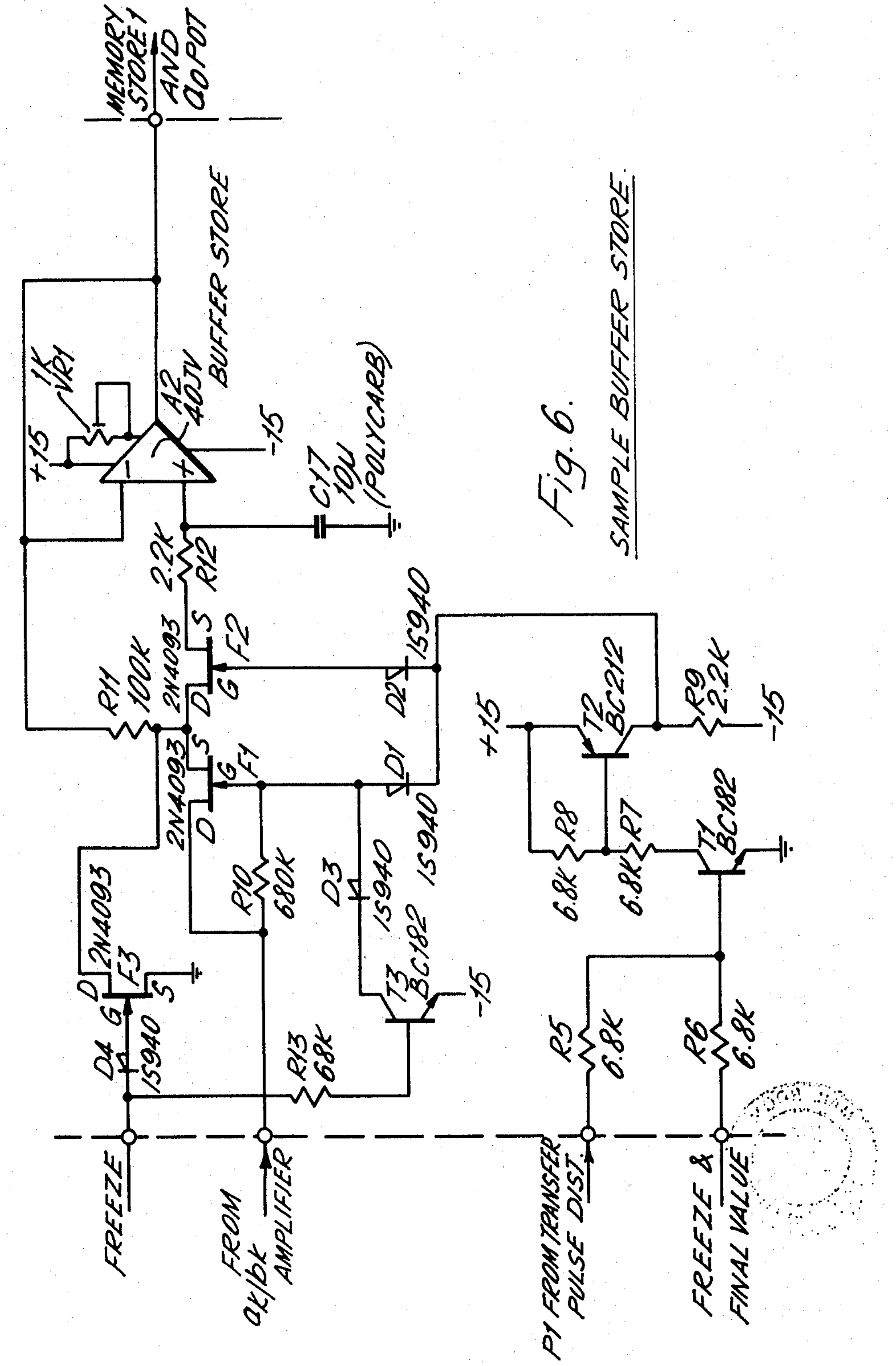
Figure 7:
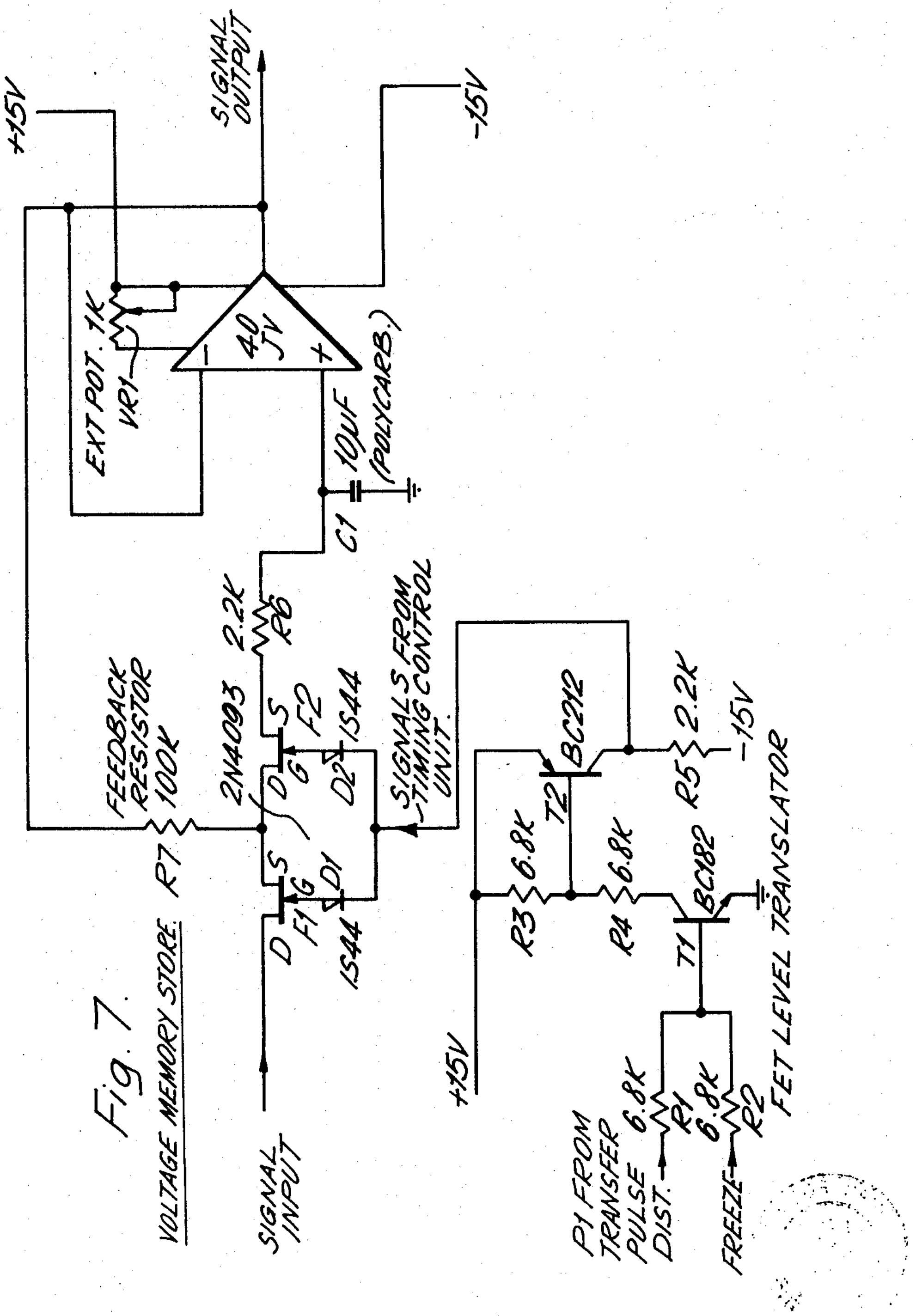
Figures 8, 8B:
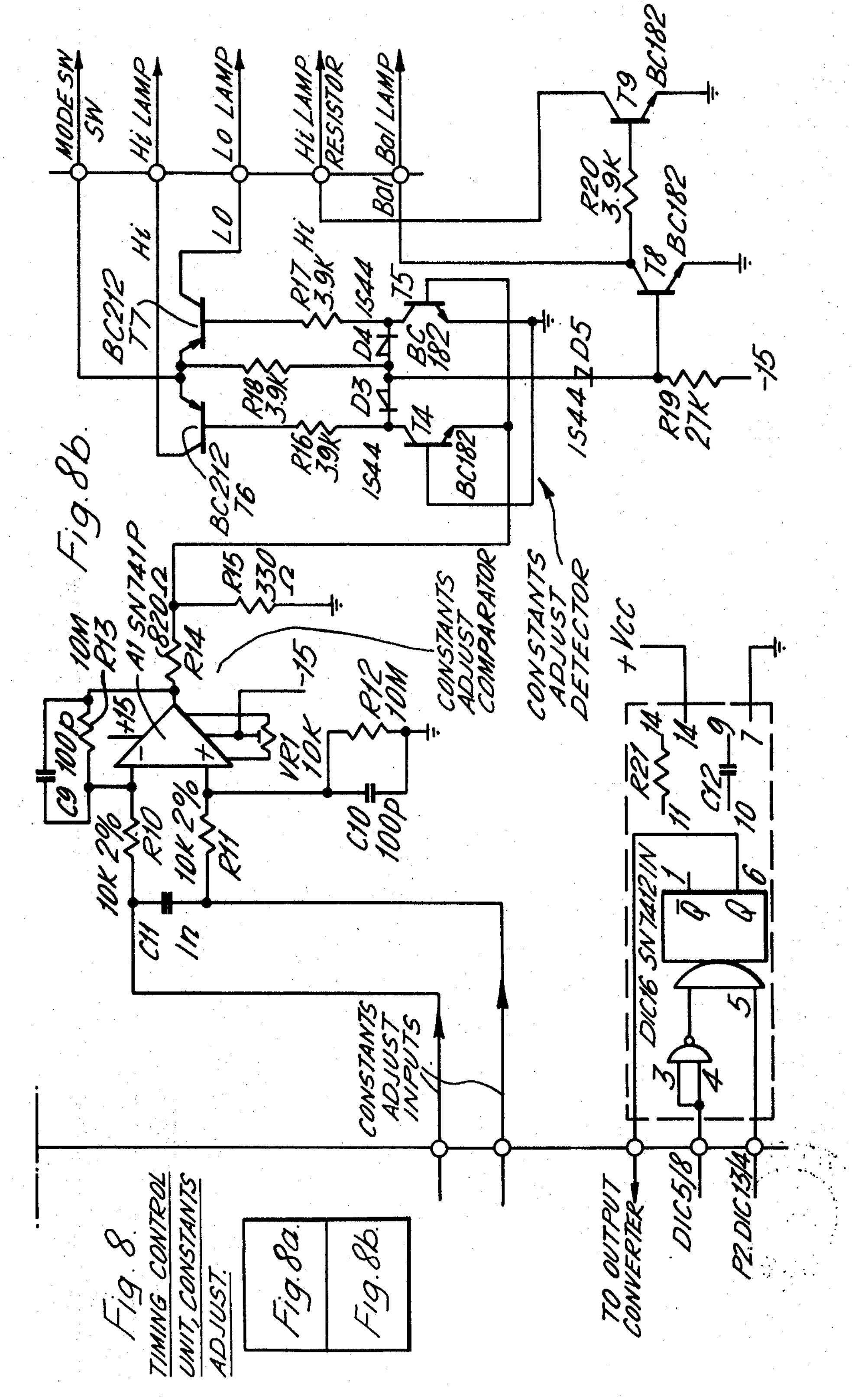
Figure 8A:
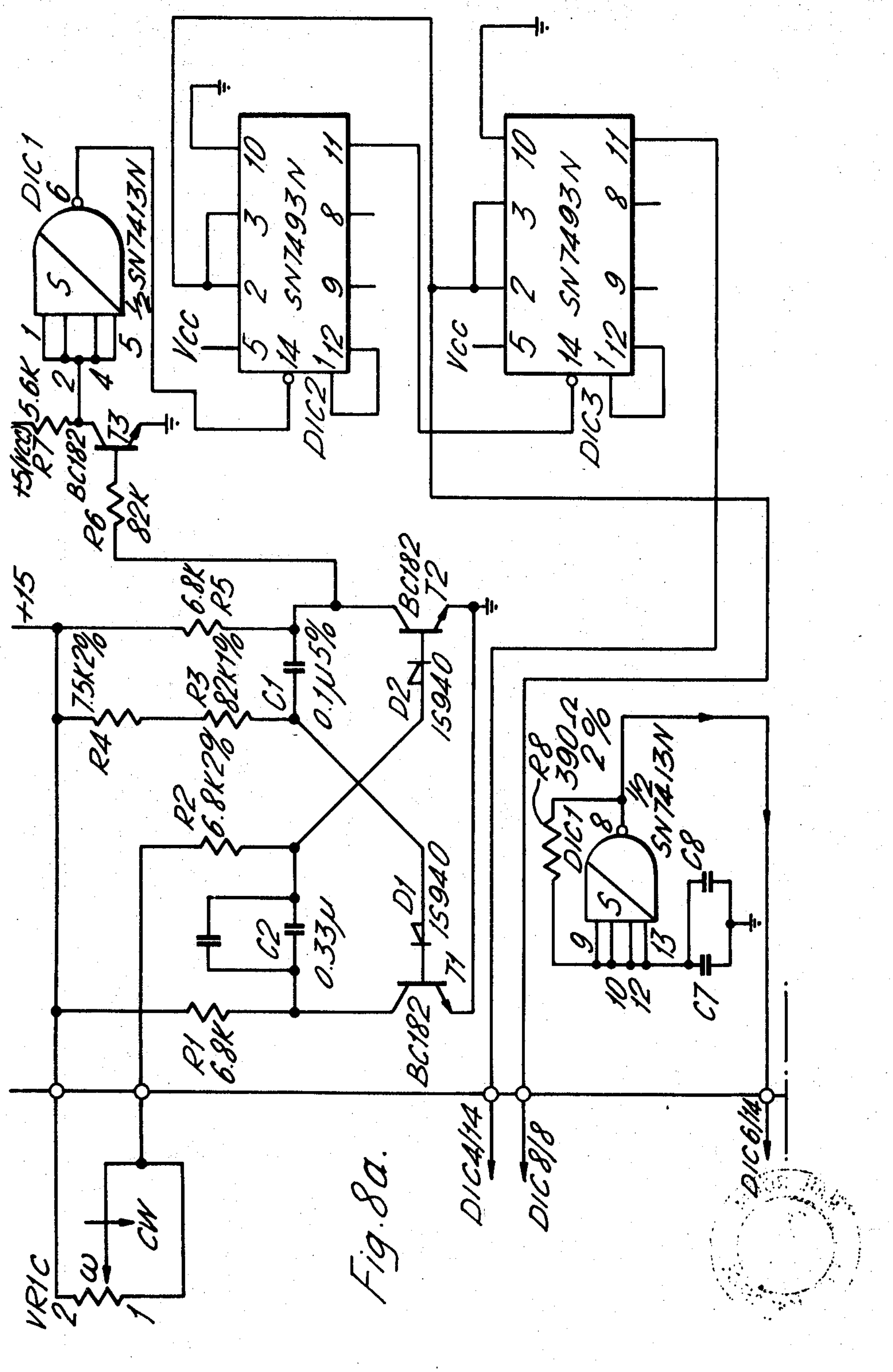
Figures 9, 9B:
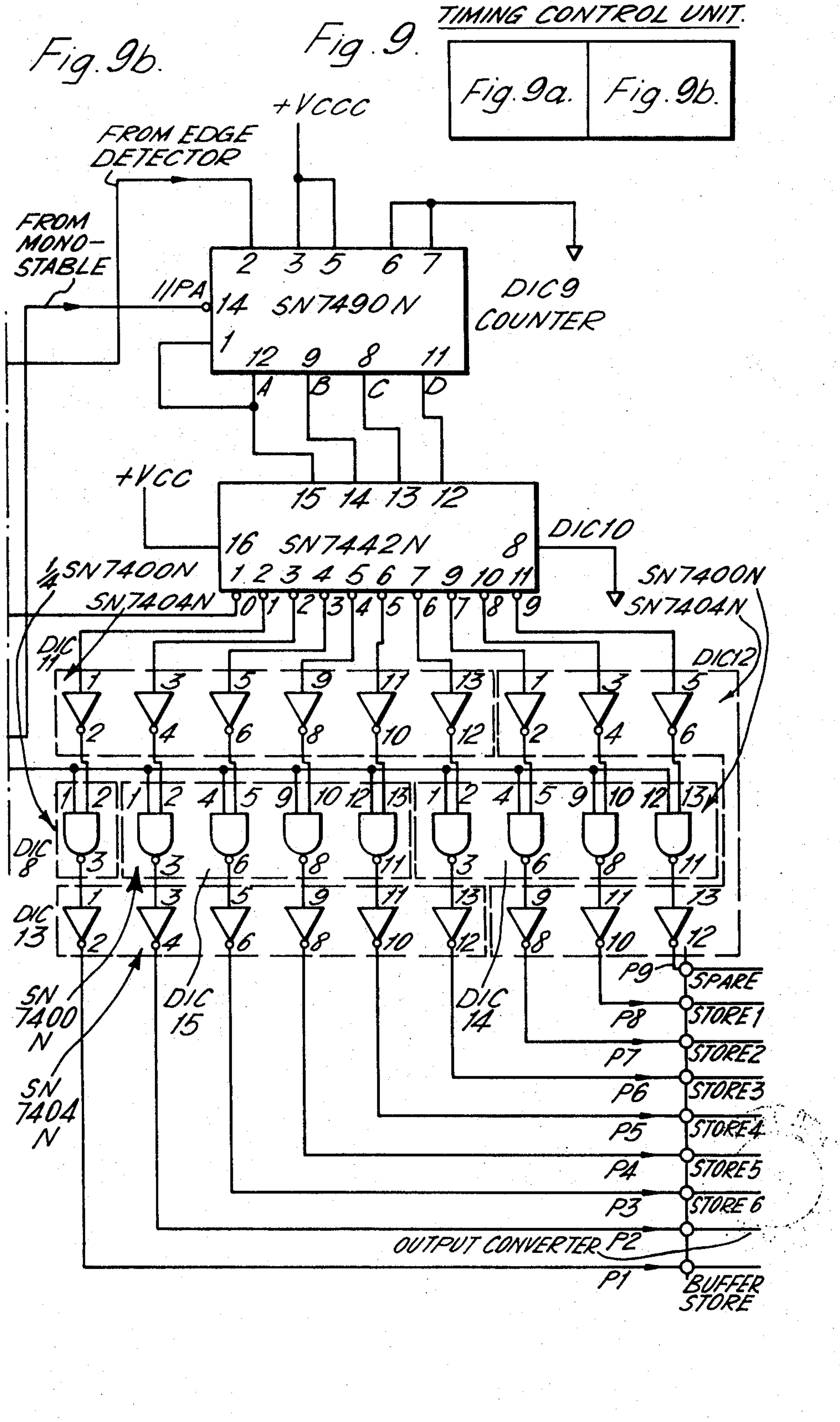
Figure 9A:
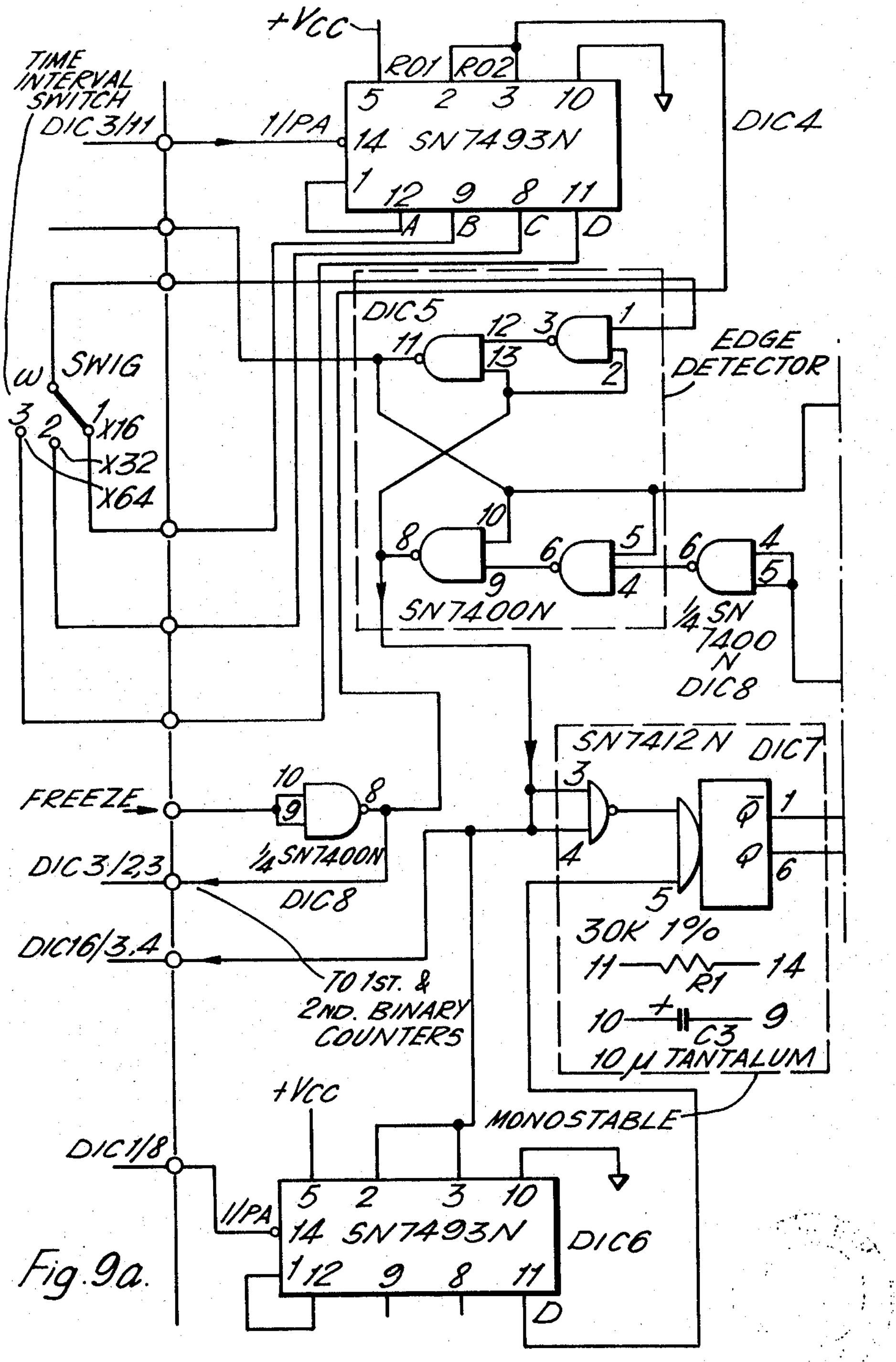
Figures 10, 10A:
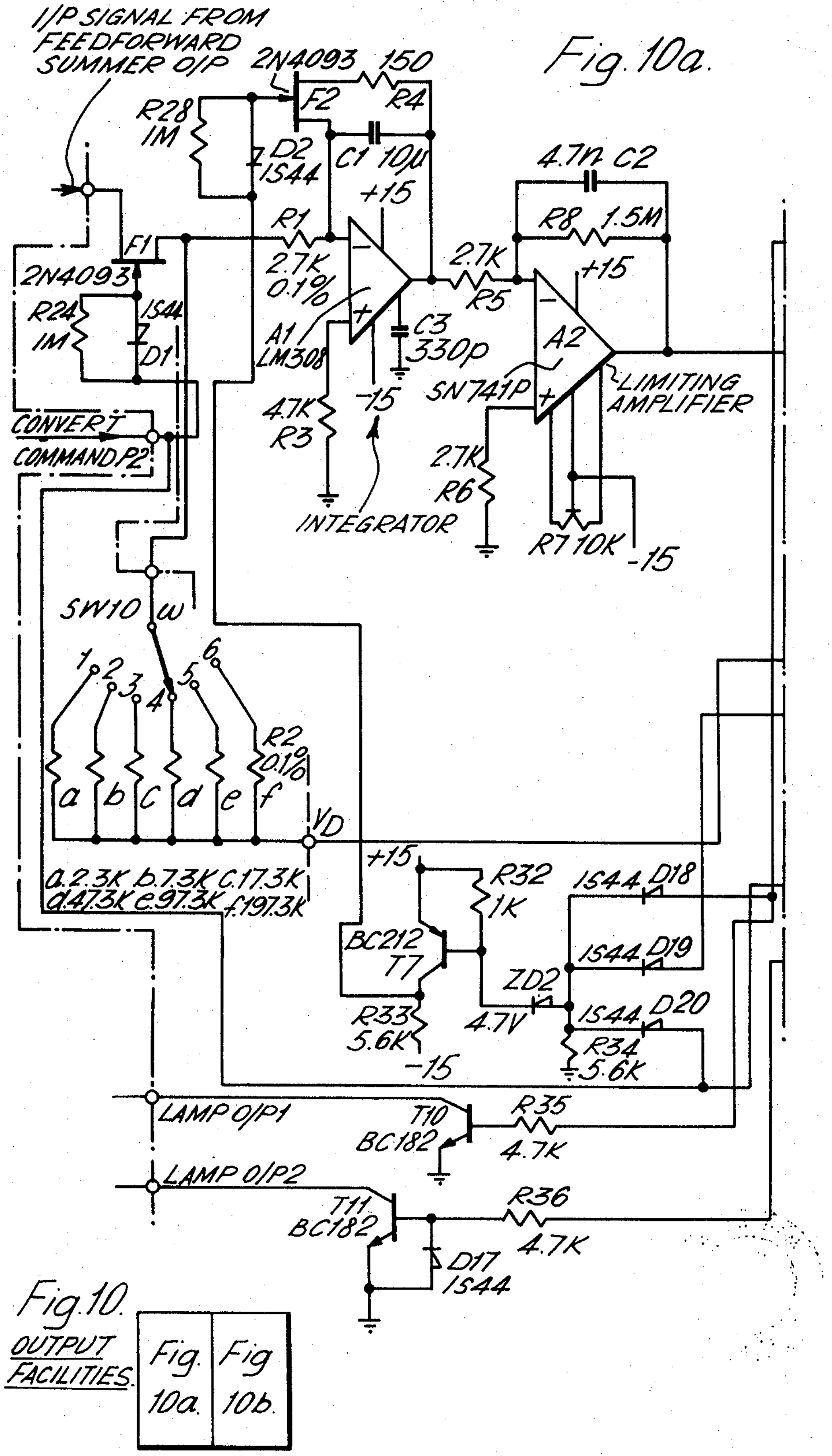
Figure 11:
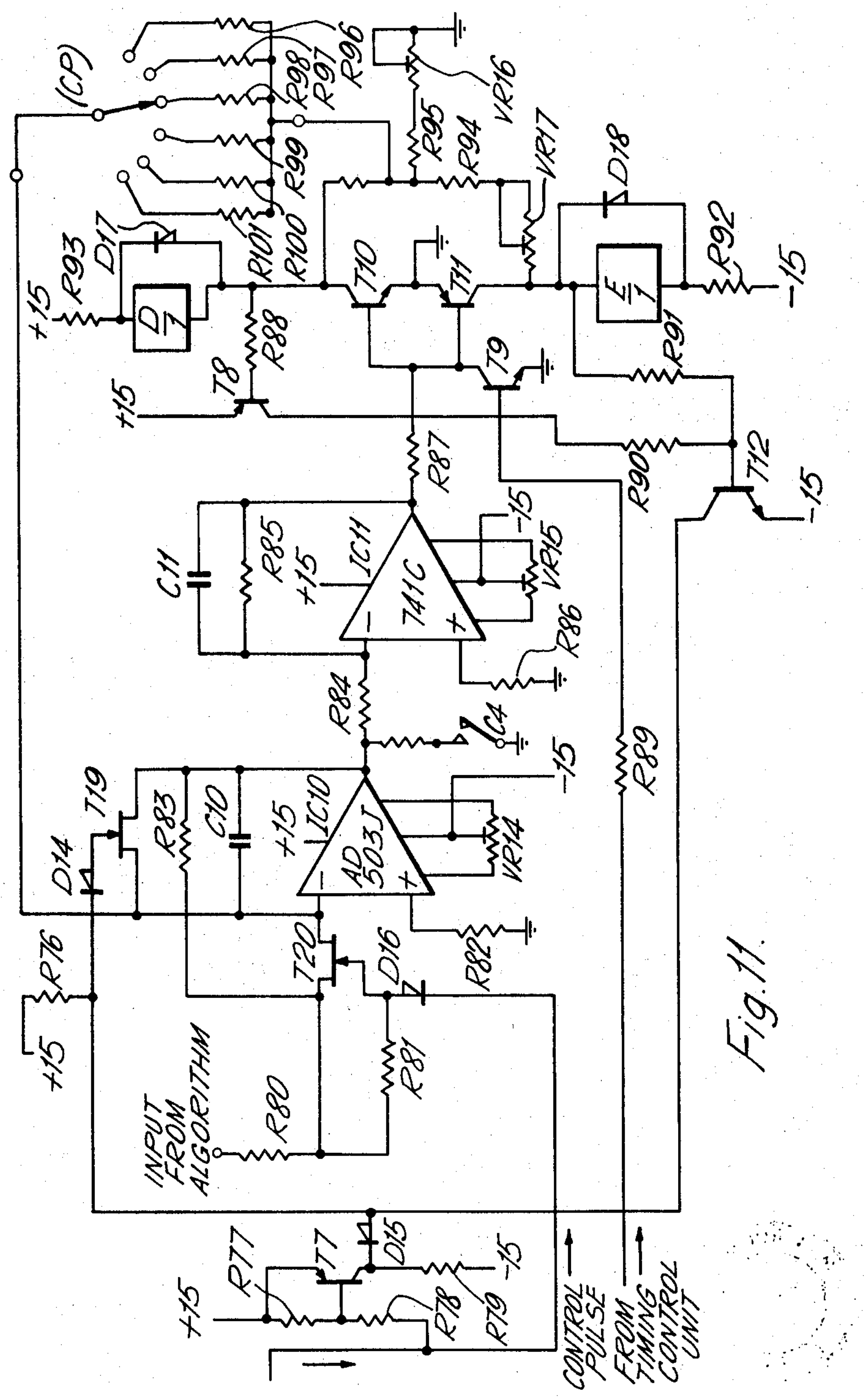
Figure 10B:
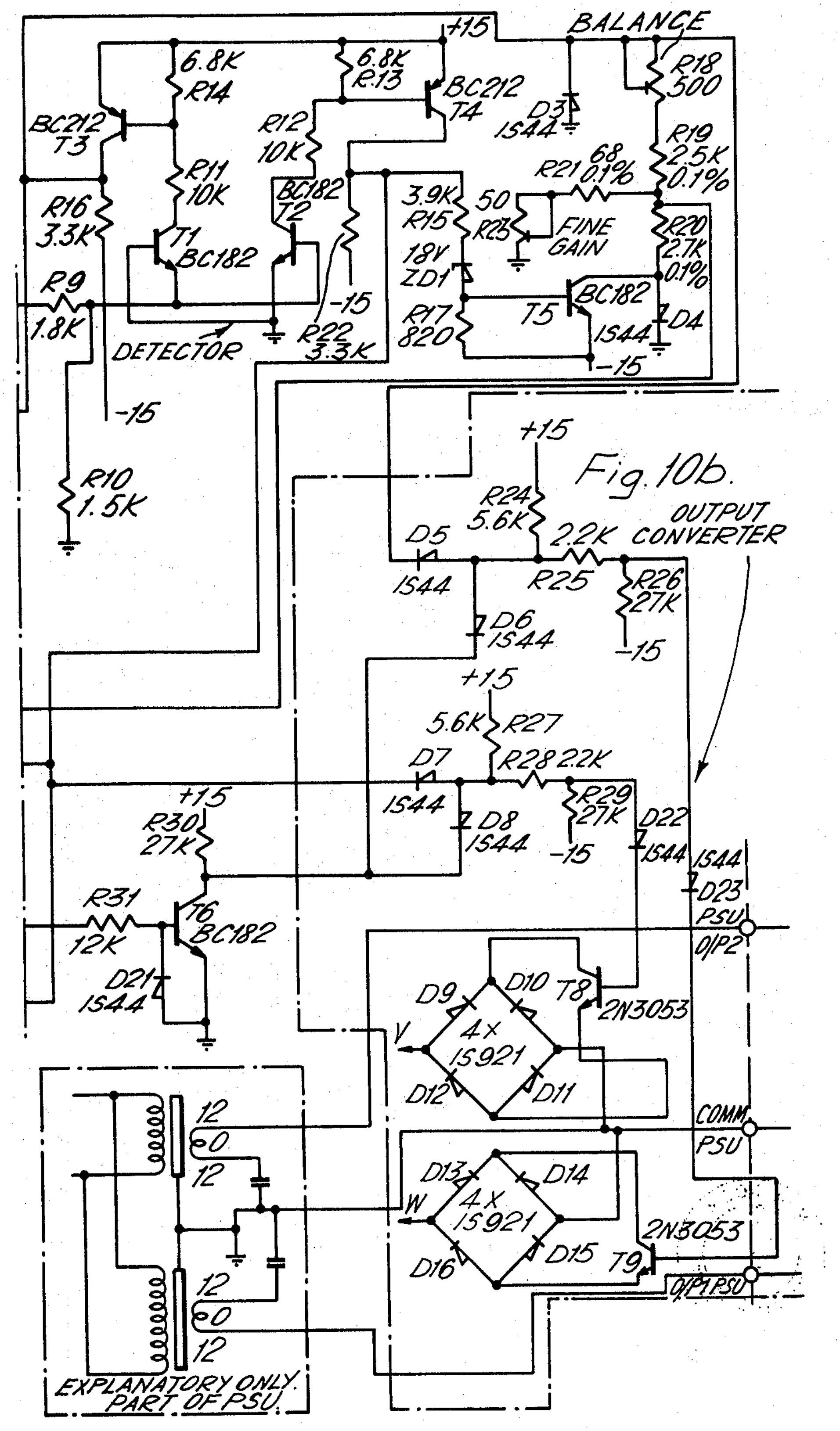

FIGS. 5*a* and 5*b* constitute a detailed circuit diagram showing the input amplifier, the feedforward summing amplifier, and the feedback summing amplifier, all forming part of the controller algorithm unit;

FIG. 6 is a detailed circuit diagram of the sample buffer store in the controller algorithm unit;

FIG. 7 is a detailed circuit diagram showing one stage of the six serially-connected voltage memory stores in the controller algorithm unit;

FIGS. 8*a* and *b* constitute a detailed circuit diagram showing part of the timing control unit of the controller of FIG. 1, and also showing constants adjustment facilities and part of the output facilities;

FIGS. 9*a* and *b* constitute a detailed circuit diagram showing the part of the timing control unit not shown in FIG. 8;

FIG. 10*a* and *b* constitute a detailed circuit diagram showing the output facilities of the controller of FIG. 1; and FIG. 11 is a detailed circuit diagram of a further embodiment of the output converter provided in the output facilities.

General Description of Sampled Data Controller

Referring to FIG. 1 which shows an overall block diagram of the sampled data controller, it can be seen that the controller has four basic parts, viz. the algorithm unit which is shown in FIG. 1 as all that enclosed by a pair of lines, the timing control unit shown as all that enclosed by a broken line, signal input facilities shown on the left hand side of the figure, and signal output facilities shown on the right hand side of the Figure. The controller incorporates its own stabilized power supply accepting mains input.

Considering the algorithm unit part of the sampled data controller first, this unit is designed to realize the control algorithm $$D(z) = E_o(z)/E_i(z) = a_k(a_o \pm a_1 z^{-1} \pm a_2 z^{-2} \pm \ldots \pm a_6 z^{-6}) / [1 + b_k(\pm b_1 z^{-1} \pm b_2 z^{-2} \pm \ldots \pm b_6 z^{-6})]$$

and includes six voltage memory stores, designated 1 to 6 in FIG. 1, each of which operates as a zero-order hold signal delay unit and is constituted by a sample-and-hold circuit arranged to be controlled by the timing control unit. The six voltage memory stores 1 to 6 are serially connected so that the output of each store is connected to the input of the next store in the series. A sample buffer store 7, similar in construction to the voltage memory stores 1 to 6, is provided before the voltage memory stores and has its output connected to the input of the first voltage memory store 1. The outputs of the six voltage memory stores 1 to 6, as well as being connected to the input of the succeeding store in the series, are each connected to feedforward constants multipliers 8 and to feedback constants multipliers 9 where the output signals are operated upon by respective constants $a_1, a_2 \ldots a_6$ and $b_1, b_2 \ldots b_6$. The output of the sample buffer store 7 also is connected to a feedforward constants multiplier to be operated upon by a constant $a_o$. The constants multipliers are constituted by potentiometers each of which provides a constant multiplier range of from 0 to 1. Connectible as desired to the outputs of the constants multipliers $a_1, a_2 \ldots a_6$ and $b_1, b_2 \ldots b_6$ are respective unity gain inverters whereby the constants may be made positive or negative as desired. The seven outputs of the $a$ constants multipliers 8 are fed to a unity gain feedforward summer 10 where they are summed to provide the algorithm unit output, and the six outputs of the $b$ constants multipliers 9 are fed to a unity gain feedback summer 11 where they are summed to provide a feedback signal for combining with the input signal to the unit. Consideration of the particular control algorithm defined above which the described algorithm unit is designed to realize, will show the presence of constants $a_k$ and $b_k$ which, in the algorithm, are multipliers acting upon the constants $a_o$, $a_1, a_2 \ldots a_6$ and $b_1, b_2 \ldots b_6$ ; these constants $a_k$ and $b_k$ are realized by means of potentiometers 12 and 13 respectively, potentiometer 12 being connected to control the gain in the forward path through an amplifier 14 of signals entering the algorithm unit and potentiometer 13 being connected to control the gain in the feedback path through amplifier 14 of feedback signals from feedback summer 11.

The timing control unit comprises two functional sections, viz. a time interval pulse generator 15 and a memory store transfer pulse distributor 16. Basically, the time interval pulse generator 15 consists of a transistor multivibrator utilizing precision components and relatively high supply voltage (e.g. + 15 volts) in order to produce a high stability oscillation, and a binary divider chain connected to the multivibrator output. The pulse repetition frequency of the multivibrator is arranged to be variable so that a large range of time intervals from 8 seconds to 128 seconds is available from the binary divider chain, with the time intervals within this range being continuously variable. The memory store transfer pulse distributor 16 contains a free-running fixed frequency pulse generator whose output drives a monostable multivibrator which is arranged to be gated with a signal derived from the time interval pulse generator 15 at the initiation of each time interval pulse: a binary coded decimal (BCD) counter receives pulses from the pulse generator gated through the monostable and these are decoded into decimal form on separate output lines by means of a BCD to Decimal decoder. The monostable circuit also provides a further output for gating each output of the decoder, the monostable being triggered by a signal derived from the time interval pulse generator 15, and the period of the monostable together with the output period of the pulse generator being so selected that the gated decoder output provides pulses for application to the voltage memory stores in the algorithm unit as store transfer pulses of sufficient duration to provide the desired store transfer acquisition time and with sufficient interpulse spacing to provide a settling time between the transfer of information out of one voltage memory store into the next store in response to one transfer pulse and the following transfer of information from an earlier store in the series into the firstmentioned store in response to the following transfer pulse. FIG. 1 illustrates by designations P1 to P8 the order in which pulses are gated from the decoder and their destination in the algorithm unit and elsewhere in the controller: the first pulse P1 is used to sample the input to the algorithm unit and write the sample value into the buffer store 7, the second pulse P2 is used to enable output circuits into a state of readiness to receive an output from the algorithm unit, the third pulse P3 causes information stored in store 5 to be transferred to store 6, the fourth pulse P4 causes information stored in store 4 to be transferred into store 5, and so on until the eighth pulse P8 causes the information in the buffer store 7 to be transferred into store 1. It will be noted that the pulse output lines of the memory store transfer pulse distributor 16 are coupled to their respective destinations via a series of voltage level translators 17; these are provided merely to translate the signal levels at the distributor pulse output lines into a level appropriate to operation of the algorithm unit.

In operation of the algorithm unit, the generation of a timing interval pulse removes an inhibit control signal from the monostable which is then driven by the pulse generator to produce a series of pulses which are applied to the BCD counter. Simultaneously with the removal of the inhibit control signal from the monostable, the BCD counter receives an enabling signal so that, on receipt of the pulses from the pulse generator, the BCD counter provides outputs to the BCD to Decimal converter which in turn produces pulse outputs on separate lines; in response to the converter performing a full count cycle and reverting to its start condition, an inhibit control signal once again is applied to the monostable. The pulse outputs of the converter are gated with pulses from the monostable to provide, on separate lines, a series of pulses of appropriate duration and with appropriate interpulse spacing for application to the sample buffer store as a data transfer pulse, to the output facilities as an enabling control pulse, and to the voltage memory stores as data transfer pulses respectively. As has previously been mentioned, the first pulse P1 from the converter serves to transfer into the sample buffer store data representative of the current error signal applied to the algorithm unit and this data provides a contribution to the algorithm unit output; other contributions to the algorithm unit output stem from the data stored in the six voltage memory stores at the time the second pulse P2 enables the output facilities. The transfer of data between voltage memory stores in response to pulses P3 to P8 occurs after the controller has provided its output for the current value of error signal and is concerned with the following operational cycle.

Signal input facilities include a signal conditioning and filtering unit 18 capable of accepting input signals of constant voltage and of constant current nature. The three major functions of the signal conditioning and filtering unit 18 are to provide appropriate signal gain and offset, to recognise when the input signal level moves outside of normal operating limits, for example as the result of a measuring instrument malfunction, and inhibit the controller from responding to such an occurrence, and also to filter the incoming signal to reduce unwanted noise and to operate on the signal to an extent, in relation with the sampling time interval, to obviate the risk of input signal contamination by frequency aliasing. For recognising out-of-limits excursions in the input signal, the signal conditioning and filtering unit 18 includes signal level detectors which, on the occurrence of an out-of-limits excursion, produce control signals which change the controller operating mode into a FREEZE condition in which no output change demands are made on the controller and the various signals circulating in the algorithm unit are all set to zero; the way in which this is accomplished will be explained fully hereinafter. Once the signal excursion responsible for causing the controller to enter the FREEZE mode has passed and the signal returns to a normal level, the controller will automatically revert to its normal operating mode. Provision is also made in the AUTO/MANUAL switching unit for switching automatically to the FREEZE mode in response to external contact closures indicating plant alarm conditions; a push-button to allow the FREEZE condition to be initiated manually may also be provided as an optional extension.

Apart from the FREEZE mode, the controller has two normal operating modes, viz. an AUTO mode in which the output signal from the signal conditioning and filtering unit 18 is compared with a desired value signal, derived from a set point servo unit 19, by means of a subtractor 20 to produce an error signal which constitutes the input signal to the algorithm unit, and a MANUAL mode. In one realisation of the controller it is possible to arrange that, when on MANUAL, the output of the signal conditioning and filtering unit 18 is fed to the set-point servo 19, so that its output faithfully follows its input, and the subtractor 20, which receives the same signal on both its inputs, produce a zero output to the algorithm unit. Signals from the manual signal inputs unit 21 then operate directly on the controller output. In the AUTO mode, set point change demands entered in a manual signal inputs unit 21 operate upon the set point servo unit 19 to change the set point. Selection of AUTO or MANUAL modes may be effected by means of a switching unit 22 which controls the operation of electromagnetic relay switches. It will be noticed that the arrangement enables a "bumpless" mode transfer to occur in switching from MANUAL to AUTO since initially the error signal applied to the algorithm unit will be zero so that the algorithm unit initially will provide a zero or no-change output.

It is possible, as an alternative, to omit the servo following of the set-point. In this case the manual signals input 21 remains always connected to the set-point, and a second pair of controls are provided to operate on the controller when on MANUAL.

The output of the algorithm unit, which is in the form of an analogue signal voltage, is converted to a pulse width modulated signal adapted for driving an integrating device. The use of a conventional Kent "Electrostep" control unit for this purpose is described by way of example. Signals are fed to this unit by way of a solid state A.C. power switch. The converter 23 and power switch 24 will be described fully hereinafter.

FIG. 1 also illustrates the incorporation in the controller of a stabilized power supply, various indicators, and adjustment means 25 and 26 respectively for adjusting the values of the *a* and *b* constants in the algorithm unit and for adjusting the time interval of the timing pulse generator 15. The adjustment means 25 and 26 will be described in detail hereinafter.

Signal Conditioning Unit 18

Figure 2:
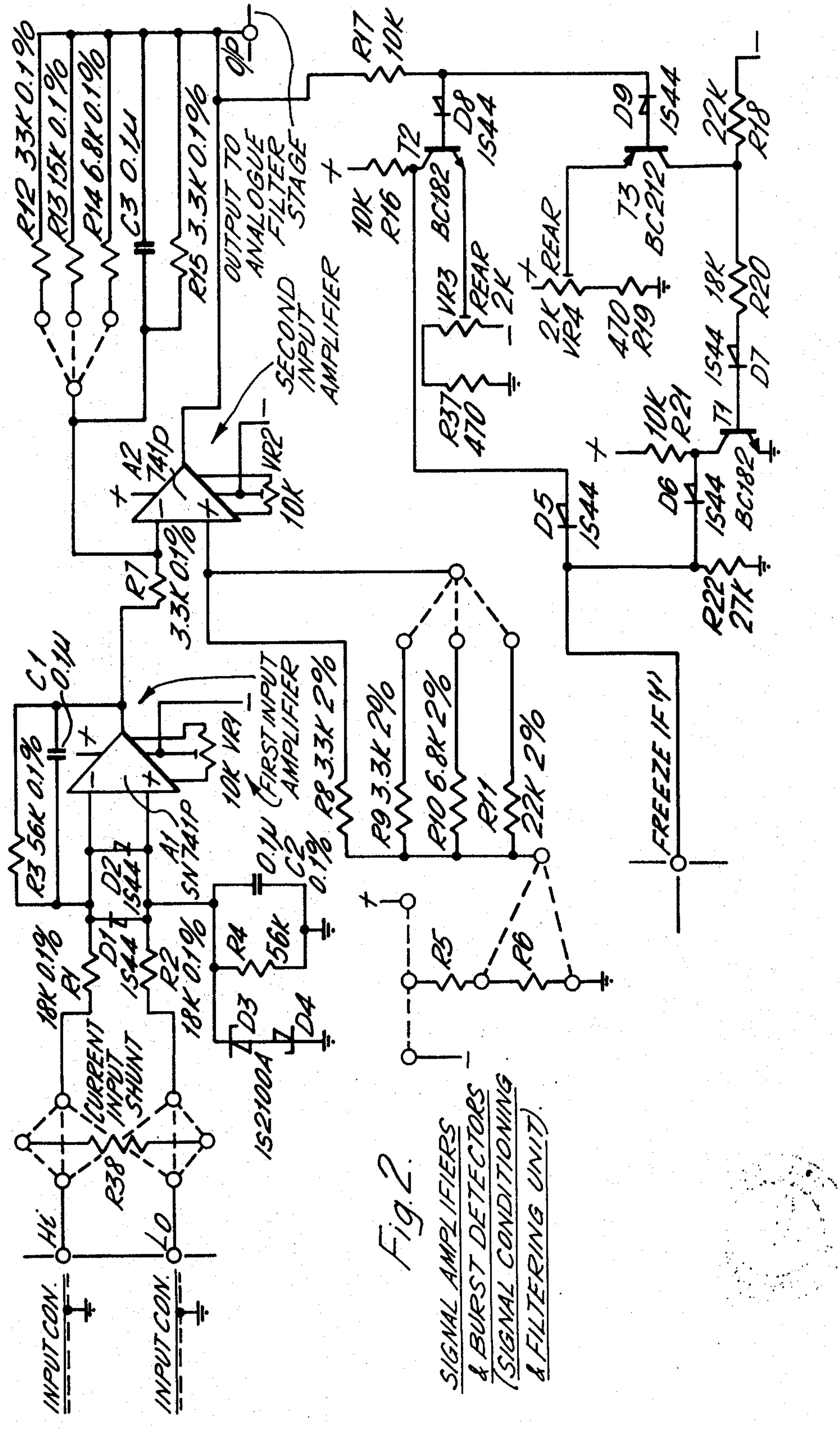
FIG. 2 shows a detailed circuit diagram of signal amplifiers and amplitude burst detectors forming part of the signal conditioning and filtering unit of the controller of FIG. 1.

Referring to FIG. 2, input signals of either a constant voltage or constant current nature are applied via a potential divider network R1, R3, R2, R4 across the input terminals of an integrated circuit linear amplifier having a differential input capability (Texas Instruments SN741P). The input signals are typically: 0–IV, 0–IV,± 1V, 4–20mA, 10–40mA, etc. For current input signals, a resistive shunt R38 is connected across the input terminals. Either input line can be grounded if required, at a remote or local point, but if, as shown, the input is ungrounded or fully floating, maxima, determined by zener diodes D3, D4, or about ±15 volts of common mode potential about earth potential can be tolerated. Parallel connected diodes D1, D2 across the amplifier input provide protection against excess series mode input signals of either polarity. Amplifier A1 has a voltage gain of approximately ×3, and a low pass frequency characteristics with a cut off frequency of about 30Hz.

The output from amplifier A1 is fed to an amplifier A2 (Texas Instruments SN741P) which provides a variable gain and signal voltage offset. Gain can be set to one of four or more values up to ×10 by the inclusion in a feed-back loop of resistors R12, R13, R14 which are selected with resistors R9, R10, R11 to maintain equal input impedances at the input terminals of amplifier A2, thus eliminating undesired offset. Offset adjustment is provided by a potentiometer R5, R6. Offset up to the common mode limit of the amplifier can be introduced.

As an alternative simplified arrangement the functions of amplifiers A1 and A2 may be combined in a single amplifier.

When the controller is operating in automatic (AUTO) mode, it is necessary to recognise when input signal go outside normal operating limits, because for example of a measuring instrument malfunction. Two overvoltage amplitude detectors T2, T3 are included to provide a control signal at terminal 29 in response to an overvoltage, to change the controller operating mode from AUTO to FREEZE. The detector thresholds may be present by potentiometers VR3, VR4 to detect over voltages of approximately ±3–15 volts. The detectors are not bistable in action and normal AUTO operation is resumed when the signal level reverts to a satisfactory value. The detector may be simplified by forming it as a rectifying diode bridge with a transistor switch connected across a bridge diagonal, and a variable resistor also connected in the bridge diagonal to allow adjustment of the detector thresholds. In such an arrangement, the positive and negative detector thresholds cannot be adjusted independently.

Figure 3:
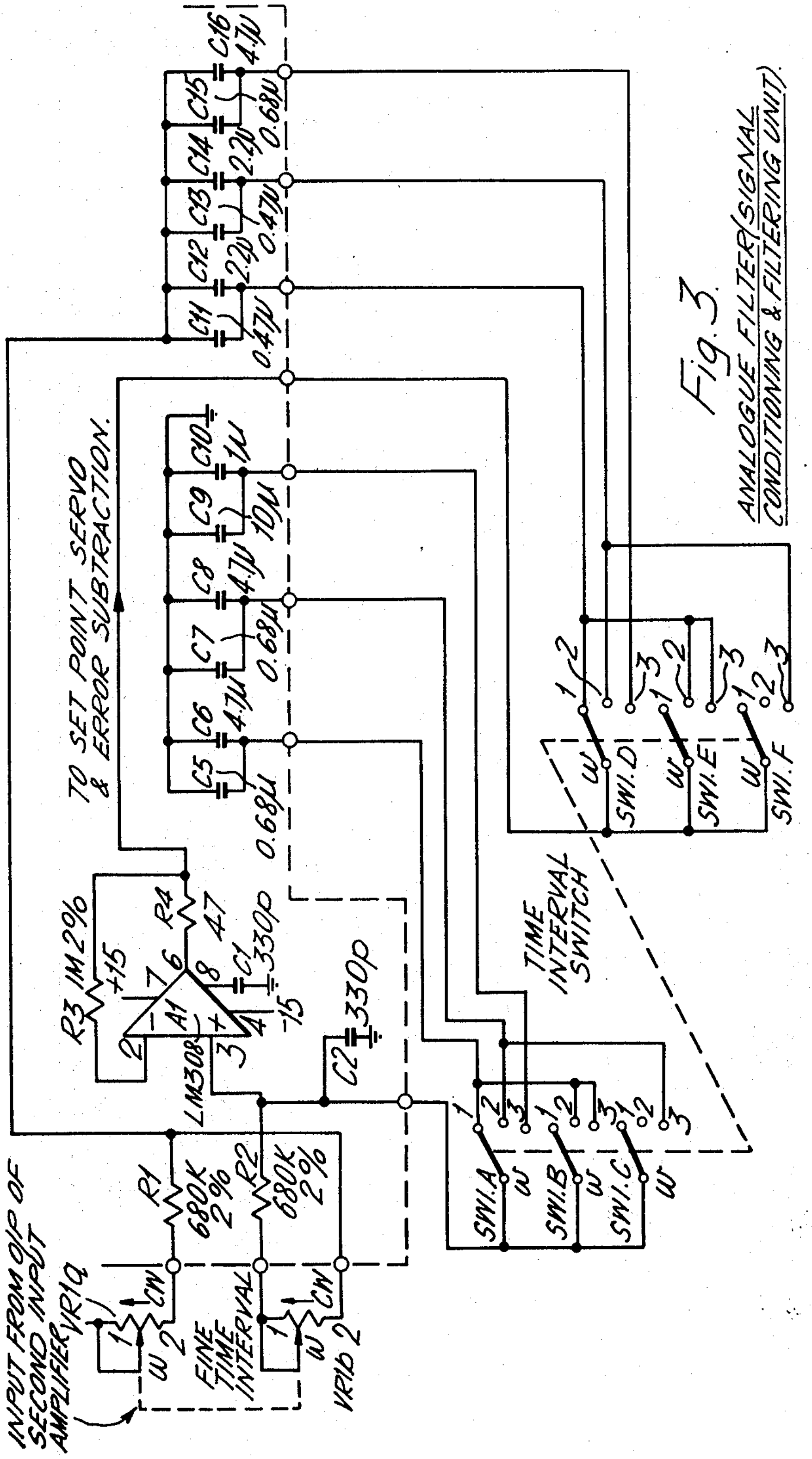
FIG. 3 shows a detailed circuit diagram of an analogue filter forming part of the signal conditioning and filtering unit of the controller of FIG. 1.

The output from amplifier A2 is passed to an analogue filtering unit, FIG. 3, comprising a controlled source double roll-off active filter whose cut off frequency corresponds to the data sampling frequency to prevent frequency aliasing. This is achieved by ganging variable resistors VR1a and VR1b to the fine control of the frequency of the time pulse generator 16 (FIG. 1) and ganging switches SW1A–SW1F to the coarse frequency control of generator 15. The band pass gain and the relative shape of the magnitude and phase characteristics remain constant during variation of the cut off frequency. A high input impedance integrated amplifier circuit (National Semiconductor LM308) is used. Stopband loss is 12dB/octave or 40dB/decade and cut-off frequency extends from 1/256HZ to 1/16Hz.

In a simplified version of the controller where there is no provision for coarse frequency control of generator 15 (see later), the capacitor switching arrangement may be omitted.

Set Point Servo Unit and Error Subtraction

Figure 4:
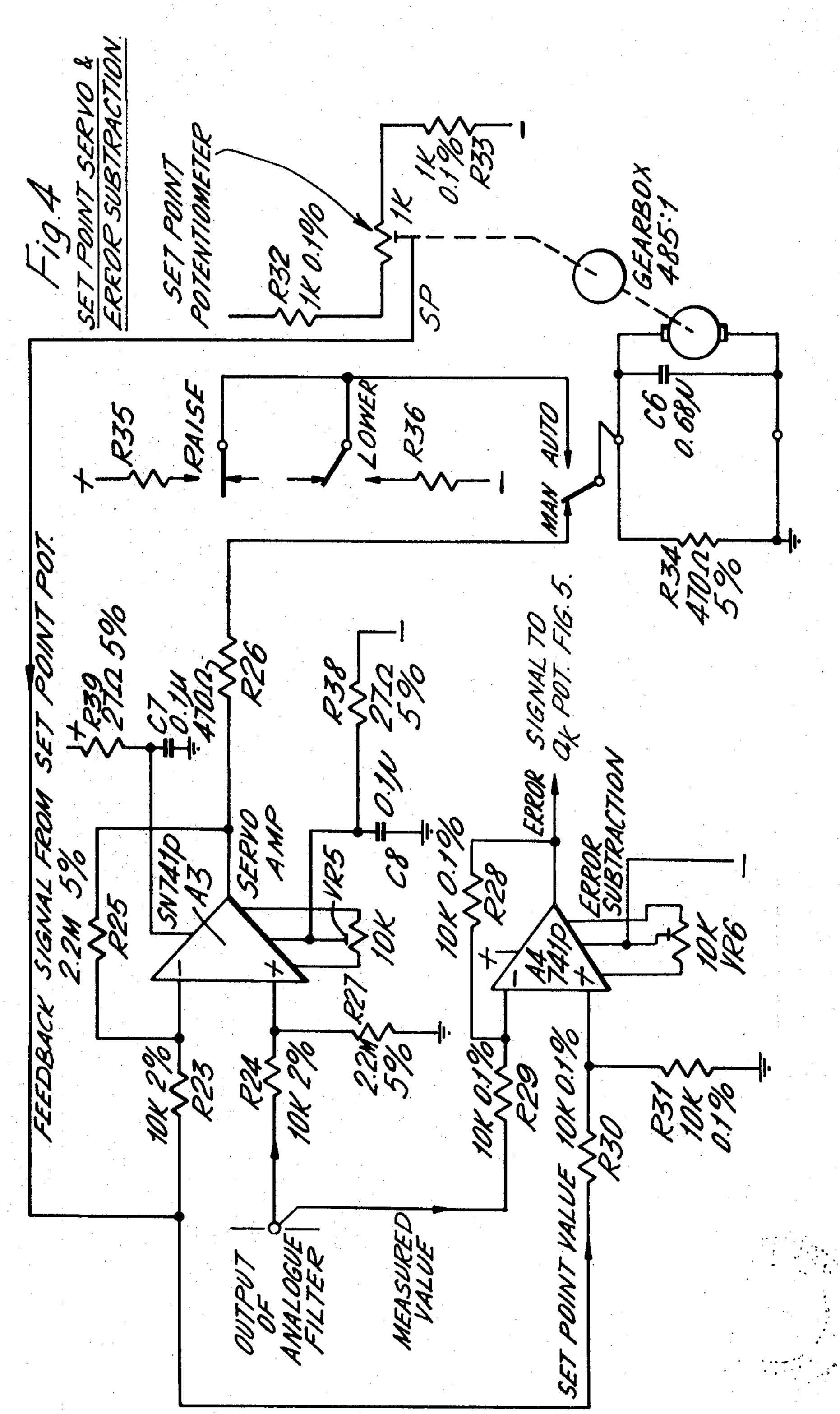
FIG. 4 shows a detailed circuit diagram of the set point servo and subtractor units of the controller of FIG. 1.

Referring to FIGS. 1 and 4, the signal output from the conditioning and filtering unit 18, is applied to the inverting input of a subtractor 20 comprising a unity gain differential amplifier A4 (Texas Instruments Sn741P), where it is compared with a reference or set point signal derived from a potentiometer R23, R33 connected to the non-inverting input of amplifier A4. The position of the potentiometer wiper, and hence the value of the set point signal, is controlled by a servomotor through a gear box. In the AUTO mode, the value of the set point remains constant until altered remotely or by the operator. To achieve this alteration the servomotor is actuated by a RAISE push button switch and a LOWER push button switch, both manually operable and both located on a control panel. When either button is depressed and the switch closed, the servomotor acts to alter the set point. The set point is displayed on a meter on the control panel; when it reaches a required value, the depressed button is raised to open the switch and stop the servomotor. Contacts (not shown) in parallel with these switches may be provided to facilitate remote adjustment of the set point value. In the absence of these adjustment demands, the set point remains constant.

It is possible as previously described to prepare for a "bumpless" transfer to occur between the MANUAL and AUTO modes by causing the set-point to follow the measured variable when on MANUAL. If this option is adopted the servomotor is controlled by the output signal of an amplifier A3 (Texas Instruments SN741P). The output signal from unit 18 is then applied to the noninverting input of amplifier A3. The output of amplifier A3, and hence the value of the set point signal will therefore follow the signal from unit 18. The two inputs to subtractor 20 are therefore equal, and the output thereof, i.e., the input of the algorithm unit is reduced to zero. This facility may be omitted if it is thought desirable, in which case the RAISE/LOWER push-buttons (and/or the remote contacts) remain operative on the set-point even when on MANUAL, and the algorithm unit is rendered inoperative on MANUAL in the same way as it is during the FREEZE mode described above.

As an alternative, the set point signal may be subtracted from the measured variable signal at a summing junction forming the input to the analogue filter, in which case the error signal is filtered. The FREEZE mode detector may be connected to the optput of the analogue filter so as to detect out of limits error signals. A further detector responding to much lower limits may also be connected to the output of the analogue filter. The purpose of this detector is to ground dangerously high error signals occurring when the machinery controlled by the controller is started up, and thus prevent correspondingly high output signals from the controller damaging the input control device for the machinery.

A further similar detector may be connected to the input of the output converter to ground control signals from the algorithm unit outside limits set by this detector and which would also produce dangerously high output signals from the output converter.

Algorithm Unit

Referring first to FIG. 5 there is shown therein the detailed circuit diagrams of the input amplifier, the feedforward summing amplifier, and the feedback summing amplifier of the interface unit.

The input amplifier (designated 14 in FIG. 1) performs the task of summing together the forward measured value input signal (i.e., the error signal operated upon by an $a_k$ constant multiplier) and the feedback signal from the feedback summing amplifier (designated 11 in FIG. 1) after it has been operated upon by a $b_k$ constant multiplier. The error signal from the subtractor unit (see FIG. 4) is applied to the $a_K$ constants multiplier constituted by potentiometer 12, and the feedback signal from the feedback summing amplifier 11 is fed to the $b_k$ constants multiplier also constituted by a potentiometer 13, and the two input signals are summed by the amplifier 14. The amplifier is a conventional integrated circuit summing amplifier constructed around a Texas Instruments device number SN 741 P, and incorporating a degree of low pass filtering and zener diode output amplitude limiting, the latter facility being included to ensure that the signal fed to the following sample buffer store does not exceed the maximum normal signal magnitude which can be accepted and operated upon in a linear fashion. Since the amplifier 14 is in a critical position as regards the overall controller computing accuracy, the inclusion of too high a gain capability should be avoided from the point of view of potential dividing in potentiometers 12 and 13 to the degree of only utilizing a portion of the potentiometers, and from the likelihood that the signal to noise ratio will degrade with increase in gain.

In a simplified version of the controller with reduced accuracy the amplifier 14 is incorporated with the buffer store (see below) the buffer store being formed as a track and hold amplifier. The feedback signal and the input error signal are summed via high value summing registors at the input of the store. The amplifier has a high input impedance and a low bias current so as to reduce the loading on the $a_k$ and $b_b$ potentiometers to a negligibly low level.

The feedforward summing amplifier 10 and the feedback summing amplifier 11 are both conventional integrated circuit summing amplifiers constructed around Texas Instruments devices nos. SN 741 p. The amplifiers each receive on a summing input all of the outputs of the six voltage memory stores after passage of these outputs through respective $a$ and $b$ constants multipliers and, where required, through unity gain inverting amplifiers. The $a$ and $b$ constants multipliers are constituted by potentiometers and means (not shown) are provided to enable the inverting amplifier to be patched in as required after the potentiometers. The output of the feedforward summing amplifier 10 is fed to the controller output facilities (see FIG. 10) and the output of the feedback summing amplifier 11 is fed to potentiometer 13 at the input of input amplifier 14.

In the simplified arrangement any of the potentiometers forming the $a$ and $b$ constants multipliers may be replaced by wired in resistors. Switches can be provided for switching out any of the feed forward or feedback paths. Constants inversion can be provided by switching the required signal to the subtracting input of the feed forward or feedback amplifiers.

As can be seen in FIG. 5, the inverting input of each of amplifiers 10,11 and 14 is connected to the emitter of a transistor (respectively T3, T2 and T1) which is arranged to be switched off when the controller is operating normally and to be switched on during adjustment of the respective constants $a_k$, $a_o$, $a_1$, . . . $a_6$ and $b_k$,$b_1$ . . . $b_6$. During adjustment of any constant, e.g., the $a_k$ constants, a known potential is applied to that terminal of the respective potentiometer which, in normal operation, would be connected to receive a data signal and the wiper of the potentiometer is adjusted until its potential equals a reference potential set on a precision potentiometer, equality being sensed by means of a comparator circuit (see description hereinafter relating to FIG. 8). In normal operation of the controller, the wipers of the constants multiplying potentiometers are loaded by fixed resistances, e.g. in the case of the $a_k$ multiplying potentiometer by the resistance R1, and the purpose of the transistors is to ensure that the wipers have the same loading when the potentiometers are being adjusted; the transistors achieve this by providing a virtual earth at the inverting input of each of amplifiers 10, 11 and 14 when the transistors are switched on since it would otherwise be possible that the amplifiers would be in a saturated state, dependent upon the potentiometer settings, resulting in the amplifiers not maintaining a virtual earth condition at their inputs.

FIG. 6 shows a detailed circuit diagram of the sample buffer store 7 of the controller of FIG. 1, the sample buffer store being constructed as a sample-and-hold circuit around an Analogue Devices integrated amplifier type no. 40JV. Two field effect transistors F1 and F2 are arranged as a double series switch to be driven from the aforesaid first pulse P1 issuing from the transfer pulse distrubutor. The amplifier is arranged to have a very high input impedance so that, when the field effect transistors F1 and F2 are turned fully on by the P1 pulse, a capacitor C17 connected between ground and the junction of the field effect transistor switch output and the non-inverting input of the high input impedance amplifier charges to a voltage equal to the voltage applied to the transistor switch input from the output of amplifier 14 in FIG. 5. After a time sufficient to ensure that the capacitor C17 fully acquires the applied voltage, the pulse P1 terminates so that the transistors F1 and F2 are switched off and the voltage on capacitor C17 is stored. The voltage fall off of the basic sample-and-hold stage is kept to a minimum by careful choice of components. Factors having a bearing upon voltage fall-off include field effect transistor switch leakage, amplifier input bias current and capacitor leakage. FET switch leakage is minimised by using the double device arrangement shown, whereby FET source-to-drain leakage is practically eliminated because of the feedback resistance R11 maintaining the input to FET F2 at nominally the same potential as the amplifier input. However, channel-to-gate leakage is not eliminated, being of the order of 50pA at 25°C, and is represents a major source of error, especially at higher ambient temperatures since the leakage approximately doubles for about every 10°C increase in temperature. Input bias current for the amplifier is very low, of the order of 20pA at 25°C, but this also doubles for every 10°C rise in temperature. A polycarbonate dielectric storage capacitor of value 10$\mu$F is used as the storage capacitor C17 because of its relatively small size and its low leakage and low polarization voltage properties. Probably the most serious contribution to stored voltage fall-off comes from capacitor leakage, especially at the lower ambient temperatures below 25°C, but this at least has the advantage that any fall-off occurs symmetrically, i.e., the fall-off rate is virtually constant for both positive and negative stored charge. At temperatures above 55°–60°C, FET switch leakage predominates producing not only increased voltage fall-off but also producing marked differences between positive and negative stored voltage fall-off rates. As a typical example, for temperatures below 50°C over a 3 minute period voltage fall-off would be less than 0.05 percent per minute of the full stored charge voltage range.

The primary aims of the sample buffer store are to provide a circuit having low voltage fall-off over a relatively long period, up to 128 seconds with the described controller, together with accurate signal acquisition.

In FIG. 5, the transistors T1 and T2 connected between the P1 pulse input from the transfer pulse distribution unit and the gate electrodes of the field effect transistors F1 and F2 merely serve as a voltage level translator to adjust the amplitude of the P1 pulse to a level appropriate to operation of the transistors F1 and F2.

It will furthermore be noted that a control input is arranged to be applied to the base of transistor T1 in FIG. 5 in response to the controller entering the FREEZE mode or in response to a FINAL VALUE command (employed in adjusting algorithm unit constants for example, when with a known input to the algorithm unit it is desired to obtain an algorithm unit output substantially instantaneously wihout having to wait while the algorithm unit processes its information in response to pulses from the transfer pulse distributor), such a control input causing field effect transistors F1 and F2 to be switched on. For entry of the controller into the FREEZE mode, a control input must also be applied to the gate electrode of a third field effect transistor F3 so as to switch FET F3 on and thereby earth the input to FET F2 to enter a zero condition in the sample buffer store. A transistor T3 is arranged to be switch on in the FREEZE mode so as to prevent FET 1 from being switched on and thus prevent the algorithm unit from accepting input data during FREEZE.

The output of the sample buffer store connects to the input of the first voltage memory store stage (FIG. 7) and also the the $a_o$ contant adjust potentiometer (FIG. 5).

FIG. 7 shows one of six identical stages which are serially connected to one another to constitute the voltage memory of the algorithm unit, and it will be seen that each of the six memory stages is identicial to the above-described sample buffer store except in that transistor T3 and field effect transistor F3 which appear in the sample buffer store do not figure in the six voltage memory stages. The six voltage memory stages function in the same way as the previously described sample buffer store, and the same considerations as regards stored charge fall-off and accurate signal acquisition are applicable to the memory stores. From consideration of the previous description of the sample buffer store it will be appreciated that, in the FREEZE mode, the zero entered into the sample buffer store as the result of switching on FET F3 will rapidly spread through all six memory stores since the interstage FET switches will all be switched on simultaneously in response to the FREEZE command signal applied to the base of transistor T1 in the respective voltage level translator associated with each stage. For a FINAL VALUE condition, the same considerations apply except in so far as the data input to the sample buffer store is not zeroed.

In the simplified version, the double FET gates of the buffer store and memory store are replaced by single FET gates controlled through integrated circuit voltage level translators. The amplifier of each store can be fully integrated.

Constants Adjustment

As has been mentioned previously, constants adjustment, i.e., the adjustment of the $a_k$, $a_o$, $a_1$, $a_2$ . . . $a_6$ and $b_1$, $b_2$, . . . $b_6$ constants is effected by adjustment of potentiometers, one potentiometer being allocated for each constant. Since each constant should be adjustable with precision, the respective potentiometers must be adjustable precisely. This can be realized by providing a precision potentiometer for each constant, but an alternative amd more economical way of attaining precision adjustment is to provide one precision potentiometer only which can be adjusted to within very close tolerances and to arrange that each other potentiometer can be compared with the precision potentiometer so as to be adjustable nominally to at least the same degree of accuracy as the precision potentiometer. Although not illustrated in the drawings, the described controller incorporates switch means whereby each constant adjustment potentiometer is connectable with a high precision potentiometer in a simple bridge circuit for comparison of the constants adjustment potentiometer setting with the precision potentiometer setting. FIG. 8 shows a constants adjustment comparator, constructed around a Texas Instruments device no. SN741*p*, which is arranged to receive one input from the wiper of a selected constants adjustment potentiometer and another input from the wiper of the precision potentiometer which is set to correspond to the desired setting of the constants adjustment potentiometer. The comparator is designed to produce an output representative of the difference between its two inputs, and this is applied to a detector circuit comprised of transistors T4, T5, T6 and T7 which is arranged to provide high, low and balance indications.

In the simplified version, constants adjustment is greatly reduced as constants $a,b$ can be provided by preferred value wired-in fixed resistors. Potentiometers, e.g., for constants $a_k$ , $b_k$ can be provided with individual analogue dials to eliminate the need for comparison bridge circuitry. These potentiometers, together with the facilities for changing the sign of the remaining constants can provide sufficient flexibility in the control algorithm to take account of most practical situations in which the controller is to be used.

If desired, manual switches may be provided to switch out individual feedforward or feedback signals from the stores so as to simplify the adjustment of the algorithm unit for certain applications.

Timing Control Unit

FIGS. 8 and 9 show detailed circuitry of the timing control unit, the time interval pulse generator part of the timing control unit being shown partly in FIG. 8 and partly in FIG. 9, and the memory store transfer pulse distributor part of the timing control unit being shown wholly in FIG. 9.

Referring first to FIG. 8, the basic time generator for the controller is a discrete component bipolar transistor multivibrator (see the top left hand corner of the Figure) constructed around transistors T1 and T2. The multivibrator utilises high precision components and relatively high supply voltages in order to produce a high stability oscillation. To enable the basic time intervals provided by the timing control unit to be adjustable within a desired range of 8 seconds to 128 seconds, one side of the multivibrator is connected to a variable resistance VR1*c* adjustment of which enables the pulse repetition frequency of the multivibrator output signal to be varied without variation of the output pulse width. As has previously been mentioned in the description of the signal conditioning and filtering unit, the variable resistance VR1*c* is ganged to variable resistances VR1*a* and VR1*b* in the analogue filter (see FIG. 3) so that the cut-off frequency of the analogue filter is tied to the pulse repetition frequency of the multivibrator. As will become apparent later, adjustment of resistance VR1a constitutes the fine time control of the timing control unit, and coarse time control is obtained by switching between various outputs of a binary divider chain.

The signal output of the multivibrator is fed through a voltage level translator comprising transistor T3 to a integrated circuit Schmitt trigger device (Texas Instruments SN7413N) which sharpens the multivibrator output pulses.

The sharpened multivibrator output pulses are applied to the input of a binary divider chain consisting of three serially connected binary counters (Texas Instruments type SN7493N), the first two of which are connected simply as divide-by-16 stages and the third of which is connected to provide an additional selectable divide-by-four, divide-by-8, or divide-by-16 facility. The third binary counter is shown in FIG. 9 to which reference may now be made. The outputs of the third binary counter are selectable by means of a switch SW1G which constitutes the coarse time control of the timing control unit, this switch being ganged to the switches SW1A to SW1F in the analogue filter stage shown in FIG. 3 again for correlating the cut-off frequency of the analogue filter with the basic timing interval set up in the timing control unit.

The selected output of the third binary counter stage is fed through switch SW1G to a logic circuit DIC 5 (Texas Instruments SN7400N) which responds to the leading edge of the counter output pulse to provide an enabling input to pin 2 of a BCD counter DIC 9 (Texas Instruments type SN 7490N) and simultaneously to provide an enabling input to pins 3 and 4 of a monostable circuit DIC 7 (Texas Instruments SN74121N). The monostable circuit DIC 7 receives on pin 5 thereof a gating input from pin 11 of divide-by-16 decade counter DIC 6 which is driven from a free running oscillator DIC 1 (see FIG. 8) constructed around a Schmitt trigger device (Texas Instruments SN7413N), so that, once the monostable circuit DIC 7 has been enabled, it produces a series of pulses the pulse repetition frequency of which is determined by the pulse repetition frequency of the oscillator DIC 1 and the pulse width of which depends upon components of the monostable DIC 7. The $\bar{Q}$ output of the monostable DIC 7 is connected to the input of BCD counter DIC 9 which, being enabled by the output of the edge detector circuit DIC 5, commences counting. A BCD to decimal decoder DIC 10 (Texas Instruments SN7442N) is connected to receive the outputs of BCD counter DIC 9 and convert these into output pulses on ten separate lines corresponding to pins 1 to 11, pin 8 being excluded. The output on pin 1 is connected back to the edge detector DIC 5 so as to apply to the edge detector an inhibit control signal at the end of each cycle, i.e., the edge detector DIC 5 receives an inhibit signal when the converter DIC 10 produces an output on pin 1 after producing a series of outputs on pins 2 to 7 and 9 to 11. The inhibit signal to edge detector DIC 5 from converter DIC 10 causes monostable DIC 7 to be inhibited until the next timing pulse enters the edge detector from the binary divider chain. The 2 to 7, 9 to 11 outputs of the decoder DIC 10 are applied to the voltage memory transfer pulse distributor unit which, as shown in FIG. 9, consists of a plurality of inverters and NAND gates (Texas Instruments: inverters type SN7404N, NAND gates type SN7400N). In the pulse distributor unit, the outputs of the decoder DIC 10 are gated with the Q output of monostable DIC 7 so as to produce on nine separate output lines a series of pulses with each pulse having a particular duration appropriate to the acquisition time of the voltage memory store stages (FIG. 7) and being spaced from the succeeding pulse by a particular duration appropriate to providing a settling time for the memory stores. The destination of the pulses produced by the distributor are indicated in the figure and will be clear from consideration of FIG. 1.

Consideration of FIG. 9 will show on the left hand side of the drawing, below counter DIC 4 and above counter DIC 6, a gate DIC 8 forming part of a Texas Instruments device SN7400N which, in the controller FREEZE mode caused by abnormal plant conditions, is arranged to produce an inhibiting signal for application to the binary divider chain formed of counters DIC 2, DIC 3 and DIC 4 to inhibit the divider chain for (at least) one time interval after the removal of the FREEZE condition to permit the controller to return to a state representative of normal plant conditions. If more than one time interval is required after a FREEZE condition to permit the controller to recover, a digital counter such as to count *n* time intervals before removing the inhibiting signal from the divider chain could be included.

In the simplified version of the timing control unit the basic sampling time interval generator is similar to that shown in FIG. 8. Voltage pulses from generator raised in level by a transistor and sharpened by a schmidt trigger are passed to a frequency division circuit comprising three ÷16 integrated circuits. There is no provision for changing the range of sampling interval by switching between outputs of the thirol integrated circuit, in constrast to the arrangement in FIG. 9. A logic circuit detects the leading edge of the sampling time interval pulse, to provide an enabling signal for the ÷16 frequency dividing circuit so as to allow the passage of a control signal from an oscillator similar to that shown in FIG. 8. Pulses from the dividers are fed to a BCD counter. Pulses from BCD counter are decoded into decimal form in a decoder. A control signal in the form of sequential pulses from outputs of the decoder is arranged to operate the stores and the output converter.

Output Voltage to Pulse Width Converter

The signal present at the output of the feedforward summing amplifier is a voltage representative of the evaluation of the algorithm, if the time relationship is correctly adhered to. Correct time information comes in the form of a pulse output (pulse P2) from the timing control unit commanding the output converter to produce an output based upon the signal amplitude occurring during the time of the command pulse.

Operation of the output converter centres around an operational integrator, having a sampled input and polarity detector which senses the output of the integrator. For the duration of the 'convert command' pulse, mentioned above, the integrator input is connected directly to the algorithm feedforward summing amplifier output, which causes the output of the integrator to ramp linearly, because the input voltage is substantially constant for the sample duration. At the termination of this period, the integrator receives another input, in the form of a constant voltage, the polarity of which is dependent upon the output polarity of the integrator. The integrator output then begins to ramp linearly, from the previously reached positive or negative voltage level, towards zero output voltage. If one considers the time for which the integrator output is other than zero and providing that one subtracts the sampling period, then that time will be directly proportional to the converter input voltage. This can be illustrated thus:

for an operational integrator,

$$V_0=\frac{-1}{CR}\int_0^t V_i\,dt=\frac{-t}{CR}V_i$$

where $V_o$ is the integrator output voltage

$V_i$ is the constant integrator input voltage and CR is the integrator time constant.

If for convenience the sampling period is made equal to CR, i.e., $t=T_s=CR$, then $V_o = V_iT_s/CR$

Now in order to allow the integrator output to return to zero, another input, $V_c$ say (a constant) is applied to the integrator. We can now put $-V_o=-V_cT1/CR$ where T1 is the time taken for the integrator output to return to zero.

Hence

$$V_o = V_cT1/CR$$

$$V_i = V_cT1CR/CR\ T_s = V_c(T1/T_s)$$

but $V_c$ and $T_s$ are constants, giving $T1$ $V_i$. The time constant of the integrator, when taking the second input (to the constant voltage $V_c$), is divided into six different ranges on the conventer, giving a wide range of output gains from 0.1 secs/volt to 4 secs/volt. For convenience of simple circuitry in the polarity detector, the integrator is followed by a high gain limiting amplifier which provides a saturated output of opposite polarity to the integrator output when the integrator output exceeds about 5mV. A special purpose, descrete component, detector is connected via a potential divider from the output of the limiting amplifier. This circuit produces a nominally +15V logic signal on either of one of two output lines when a positive or negative voltage of larger than approximately 2 volts is present at the limiting amplifier output. If less than 2 volts is sensed, then both logic outputs are at approximately ground potential.

The construction of the output voltage to pulse which converter will now be described with reference to FIG. 10. The circuit shown in constructed to perform the following three main operations simultaneously:

(1) A linear ramping of the integrator output voltage away from zero during the duration of the pulse P2 from the timing control unit, and then a linear ramping of the integrator output voltage back towards zero voltage under the influence of a constant voltage $V_c$ applied from a polarity detector to the integrator input. The time taken for the ramping back towards zero voltage defines the width of the output pulse, and, as has been shown, is proportional to the algorithm output voltage.

(2) An FET clamp connected across the input and output of the integrator is inhibited during the operation of the integrator, i.e., during the durations of the pulse P2 from the timing control unit and the output pulses initiated and terminated by the polarity detector. To this end, the gate of the FET clamp is controlled by a DTL NOR gate which receives signals from the timing control unit and the polarity detector.

(3) Production of an output pulse during the linear ramping of the integrator output voltage back towards a zero voltage level after the termination of the pulse P2 from the timing control unit.
Two diode AND gates arrangments on two output lines are controlled by the pulse P2 and voltages from the polarity detector to produce the output pulses. An output pulse on one line corresponds to a RAISE command, and an output pulse on the other line corresponds to a LOWER command.

Referring to FIG. 1, the second pulse P2 from memory transfer pulse distributor 18 is applied to the voltage to pulse width converter 23, through a one shot multivibrator which narrows pulse P2 from 100 mS to 25 mS (see FIG. 8 DIC 16) and through a gate which inhibits passage of the pulse in the FREEZE mode.

Referring to FIG. 10, it can be seen that pulse P2 performs three functions corresponding to the three operations defined above:

(1) An FET switch is turned on (pulse P2 being positive) so that the output voltage from the algorithm unit may be applied to the first stage of the converter. The first stage comprises an integrator R1, C1, A1 (National Semiconductor LM308). The time constant RICI of the integrator is chosen such that the output of the integrator ramps linearly (the input voltage is substantially constant) during the duration of pulse P2 to a value equal in magnitude, but opposite in polarity, to the input voltage.

(2) Pulse P2 is applied through a diode D20 of an OR gate D18, D19, D20 to switch off a normally switched on transistor T7. It can be seen that diodes D18–20 and transistor T7 form a DTL NOR gate. When transistor T7 is switched off a negative voltage is applied to the gate of an FET clamp F2, connected across the input and output of the integrator, to turn the FET off and thus render the clamp inoperative during the duration of the pulse P2. The clamp acts during inoperative periods of the converter to reduce the chance of spurious signals or noise producing an unwanted conversion and also ensures that for each conversion, the integrator starts ramping from zero, or very nearly zero voltage. If the integrator were left unclamped, the output would drift because the integrator would integrate its own input current, small though it is.

(3) Pulse P2 turns on a transistor T6, thus producing negative going input signals at the cathodes of diodes D6, D8, which form inputs of diode AND gates D5, D6 and D7, D8. The voltages at the junction of resistors R25, R26 and R28, R29 are therefore negative and diodes D22, D23 on output lines are reverse biased to prevent passage of output signal pulses. The purpose of this arrangement will be explained later.

Referring back to function and operation (1), the output of the integrator is applied to the second stage of the integrator, a high gain limiting amplifier A2 (Texas Instruments SN741P) which provides a saturated output of opposite polarity to the integrator output when the integrator output exceeds about 5 mV, i.e., roughly when the integrator output is non-zero. This threshold value of about 5 mV, effectively "deadspace," can easily be changed in use and may have to be increased if noise and offset become troublesome. The output of the limiting amplifier is applied to the input of a detector unit, i.e., the base-emitter junctions of transistors T1, T2. Transistors T1, T2 could be replaced by complementary transistors and the limiting amplifier output applied to their bases. As the output of the limiting amplifier is either saturated positively or negatively during operation of the converter, one of transistors T1, T2 will be turned on, and the other will be turned off.

Consider first the case of positive saturation, i.e., a positive algorithm output voltage with consequent switching on of transistor T2. This will cause transistor T4 to be turned on, thus maintaining FET clamp F2 inoperative by applying a positive voltage through diode D19 of the OR gate (Cf. Operation 2), turning on a transistor T11 to light a corresponding indicator lamp on a control panel, and reverse biassing a diode D7 which forms one input to the diode and gate D7, D8 (Cf. Operation 3). Diode D7 is normally forward biassed through the path R27, R22 in order that the output voltage level of the AND gate be negative and that diode D22 on the output line sould be reversed biassed so that no output signal can be given. When diodes D7 and D8 are reverse biassed, i.e., when transistor T4 is turned on and pulse P2 is not present (cf. function (3) of pulse P2 described above), both inputs to the AND gate are positive, and the output of the AND gate will be positive. Diode 22 on the output line will be forward biassed, and a positive output voltage signal will be given for as long as diodes D7, D8 are maintained reverse biassed.

The turning on of transistor T4 also causes transistor T5 to be turned on, reverse biassing diode D4 and producing a negative voltage of about −1V at the junction of resistors R20 and R21 in a voltage dividing arrangement (Cf. Operation 1). This negative voltage is fed back through a resistor R2 to the input of the integrator. The voltage will be inoperative when FET switch F1 is held on by pulse P2 since the input to the integrator will be held at the constant algorithm output voltage. It should be remembered that in the case being considered, the algorithm output voltage is positive. When FET F1 reverts to the off state, capacitance C1 is discharged through resistors R1 and R2, which has one of several values, by the application of negative voltage. Resistor R2 determines the rate of discharge of C1, and hence determines the gain of the converter. The integrator output therefore ramps linearly from a voltage equal and opposite to the algorithm output voltage to zero, and the time taken for the output to reach zero is proportional to the algorithm output voltage. When the integrator output voltage reaches zero, the output of amplifier A2 is reduced to zero, transistor T2 is turned off, the output of the voltage divider fed back to the integrator input is reduced to zero, FET clamp F2 is turned on, the indicator lamp controlled by transistor 11 is extinguished, and diode D7 reverts to its normal forward biassed state to commutate the output signal. The duration of the output pulse is therefore equal to the time taken for the integrator output voltage to ramp linearly from a voltage level equal in magnitude to the algorithm output voltage to zero, and is therefore proportional to the algorithm output voltage. The converter will remain in this quiescent state until the next pulse P2 from the memory transfer pulse distributor 16.

In the above considered case, the algorithm output voltage was positive. Consider now a negative algorithm output voltage applied to the integrator. The output from amplifier A2 will be negative, turning on transistors T1 and T3. FET clamp F2 is held off by a positive voltage applied through diode D18 of the OR gate, a control panel lamp controlled by transistor T10 is lit, a diode D3 is reverse biassed and a positive voltage of about +1V is produced at the junction of resistor R19 and R21 in the voltage dividing arrangement. A diode D5 in a second AND gate D5, D6 receives a positive input signal from the polarity detector, and when diode D6 also receives a positive input signal, i.e., when pulse P2 is terminated and transistor T6 is turned off, both inputs to the AND gate are positive, and a positive pulse on a second output line is initiated. The operation of the converter then proceeds in a manner analogous to that described above.

Summarising the action of the algorithm output voltage to pulse width converter, a pulse P2 enables the algorithm output voltage to be applied to the input of the integrator which is arranged so that the output of the integrator rises linearly from zero potential to a voltage level equal and opposite to the algorithm voltage during the duration of pulse P2. Of course, the equal and opposite voltage level is chosen merely for convenience, and any other predetermined level could be chosen. A constant voltage opposite in polarity to the algorithm voltage is then applied from a polarity detector to the input of the integrator to ramp the output of the integrator linearly back to zero voltage. Pulse P2 and a signal from the polarity detector are applied to AND gates so that when pulse P2 is terminated, an output signal pulse from the converter is initiated on one of two output lines, depending on the polarity of the algorithm output voltage. An output pulse on one output line corresponds to a RAISE command, and an output pulse on the other output line corresponds to a LOWER command. The output pulse is commutated when the output of the integrator regains a zero voltage level. The width of the output pulse is therefore proportional to the manitude of the algorithm output voltage. The converter then remains in a quiescent state until a further pulse P2 is received.

In a further embodiment of the output voltage to pulse width converter shown in FIG. 11 the general arrangement and mode of operation is similar to that shown in FIG. 10.

However, the linear operational integrator of FIG. 10 is replaced by a track and ramp integrator IC10, C10, R83. The output of the integrator follows the output from the alogorithm unit so long as an input FET gate T20 is closed (the gate being controlled by a voltage pulse from the timing control unit) but when the gate is opened, the output of the integrator ramps back linearly to zero under the influence of a constant voltage, opposite in polarity to the algorithm output, applied to the input of the integrator. During this ramping, an output pulse is produced on RAISE or LOWER lines, and as was shown above, its width is proportional to the algorithm output voltage.

The second stage of the converter is as is shown in FIG. 10, i.e., a detector comprising a high gain limiting amplifier providing a saturated output. In operation the saturated output turns on, depending on its polarity, either a transistor T10 or a transistor T11 in the polarity detector forming the third stage of the converter. The turning on of T10 or T11 energises a respective relay D or E to produce RAISE or LOWER signals on output lines.

At the same time, a constant voltage is produced at the junction of resistors R94,R95 which is fed back to the input of the integrator through one of resistors R96–R101. If desired a non linear circuit may be inserted in the feedback path to compensate for nonlinearities in an output device driven by the converter. The non linear circuit may comprise a matching circuit for the output device the matching circuit producing an inverse characteristic of the characteristic of the output device which may be for example a square law.

The matching circuit is controlled by a feedback signal from the output device, and the matching circuit output is multiplied with the discharge voltage produced by the polarity detector. The multiplying circuit may include an FET whose gate is controlled by the matching signal and which conducts the polarity detector signal through its source-drain path.

The polarity detector is inhibited from operating while the integrator follows the output from the algorithm unit by a transistor T9 switched on for the duration of the control pulse from the timing control unit.

An FET clamp for the integrator is inhibited during the cycle of operation of the converter by means of a transistor OR gate T7,T12.

Solid State AC Power Switch

The output signals could be used to drive thyristors or triacs. However, these have a significant leakage current. The Kent "Electrostep" control unit only requires an input current of about 10 mA. The switching bridge circuits shown in FIG. 10 have negligible leakage currents. In each bridge, a transistor is connected is connected across one diagonal and the other diagonal is connected in series with a 24v 50 $H_7$ AC source. When the transistor is turned on in response to an output pulse from converter 23, alternating current flows through the diodes and the transistor to the control unit. One bridge receives RAISE command pulses, and passes alternating current which acts on the control unit accordingly, and the other bridge receives LOWER command pulses, and passes alternating current which acts on the control unit accordingly. In the FREEZE mode, a switch between the converter 23 and the solid state AC power switch 24 is opened, thus rendering switch 24 inoperative.

We claim:

1. A sampled data controller comprising signal input facilities, signal output facilities, and an algorithm unit adapted to realize the algorithm $$D_s=\frac{E_o(z)}{E_i(z)}=\frac{\sum_{j=0}^{j=n} a_j\cdot z^{-j}}{1+\sum_{j=1}^{j=n} b_j\cdot z^{-j}}$$

wherein $a_o$, $a_1$, . . . $a_n$ and $b_1$ . . . $b_n$ are constants, $z^{-1}$ is the $z$-transform operator of delays, and $E_o(z)$ and $E_i(z)$ are the algorithm unit output and input respectively: the signal input facilities including;

a. means responsive to deviation of a controlled variable from a reference value for deriving an error signal constituting $E_i(z)$, and b. means for filtering the controlled variable to suppress components thereof at the data sampling frequency of the controller thereby to prevent frequency aliasing; the algorithm units including;

c. a summing circuit adapted to receive the error signal $E_i(z)$ and sum it with a feedback signal derived in the algorithm unit, d. a sample buffer store coupled to the output of the summing circuit and arranged, in response to a sampling command, to sample the sum signal in the summing circuit and hold the sampled value, e. a plurality of serially-connected memory stores each adapted to perform a zero-order hold function, the output of each memory store being connected to the input of the next succeeding store and the first memory store being connected to receive an input from the sample buffer store, the arrangement of the memory stores thus being such as to enable the transfer of stored data from each memory store to the succeeding serially-connected memory store during each sampling period, f. means connected to each of said plurality of memory stores for deriving from the signals stored therein feedforward and feedback signals respectively comprising the signal stored in a respective memory store multiplied by a respective feedforward constant $\pm a_n$ and the signal stored in a respective memory store multiplied by a respective feedback constant $\pm b_n$, the said means also serving to derive from the signal stored in the sample buffer store a feedforward signal comprising the signal stored in the sample buffer store multiplied by $\pm a_o$, g. means for summing said feedforward signals to derive a signal constituting $E_o(z)$ and for summing said feedback signals to derive a signal for summation with the input signal $E_i(z)$ in the said summing circuit, and h. a timing control unit having command outputs connected to each of said plurality of memory stores and to said sample buffer store for coordinating the sampling of data by the sample buffer store with transfer of data between successive ones of said plurality of memory stores, said timing control unit being such as to permit continuous variation of the sampling interval;

the signal output facilities including i. means responsive to the said feedforward signal from the algorithm unit for deriving a control signal for application to control means for variable to reduce said deviation.

2. A sampled data controller according to claim 1 wherein the timing control unit (h) incorporates a time interval pulse generator comprising a multivibrator circuit adapted to provide a high stability oscillation and a binary divider chain connected to the multivibrator output, the pulse repetition frequency of the multivibrator being continuously variable within a predetermined range and the division ratio of the binary divider being selectable, and a memory store transfer pulse distributor responsive to the output of the binary divider chain.

3. A sampled data controller according to claim 2 wherein the memory store transfer pulse distributor incorporates a free-running fixed-frequency pulse generator the output of which drives a monostable multivibrator circuit which is arranged to be gated with a signal derived from the time interval pulse generator at the initiation of each time interval pulse, a binary-coded-decimal counter being arranged to receive pulses from the pulse generator gated through the monostable circuit and a binary-coded-decimal to decimal decoder being arranged to decode these into decimal form on separate output lines for application inter alia to the plurlity of memory stores as transfer commands.

4. A sampled data controller according to claim 1 wherein the algorithm unit is adapted to provide an analogue output signal and means are provided for converting the analogue output signal into a pulse width modulated signal.

5. A sampled data controller according to claim 4 wherein for converting the analogue output signal into a pulse width modulated signal there is provided an integrator connected to receive the output of the algorithm unit during a predetermined output sampling period, and means for ramping from the integrated output signal level to a predetermined base reference level at a predeterined rate whereby the duration of said ramping is commensurate with the output signal.

6. A sampled data controller according to claim 5 wherein a polarity detector is coupled to the integrator output for detecting the polarity of the output signal thereby to determine the direction of said ramping.

7. A sampled data controller according to claim 1 wherein said signal input facilities include means responsive to excursions of the input signal outside of normal operating limits for causing the controller to enter an operational mode in which no output change demands are made and the signals stored in the algorithm unit are set to zero.

8. A sampled data controller according to claim 1 wherein the algorithm unit is adapted to process analogue signals, the summing circuit (c) comprising an analogue summer, the sample buffer store (d) and the plurality of serially-connected memory stores (e) each comprising analogue sample and hold stages, the constants multiplier means (f) comprising analogue circuits, and the feedforward and feedback summing means (g) comprising respective analogue summers.

9. A sampled data analogue controller comprising: comparator means responsive to an analogue signal representative of a variable to be controlled and to a reference signal for deriving an analogue error signal;

an analogue input summing circuit coupled to sum said analogue error signal with a feedback signal;

a sample buffer store in the form of an analogue sample-and-hold circuit coupled to the output of said analogue input summing circuit and arranged, in response to a sampling command, to sample the sum signal thereform and hold the sampled value;

a plurality of serially-connected analogue memory stages each in the form of an analogue sample-and-hold circuit designed to perform a zero order hold function, the output of each memory stage being connected to the input of the succeeding stage with the first stage being connected to receive as its input the output of the sample buffer store;

a plurality of analogue feedback constants multipliers connected one to each of said plurality of memory stages and each adapted to multiply the signal stored in the respective memory stage by a feedback constant;

an analogue feedback summer connected to receive the signals from the feedback constants multipliers and sum these signals to derive a signal which is fed back to said analogue input summing circuit for summation with the analogue error signal;

a plurality of analogue feedforward constants multipliers connected one to each of said plurality of memory stages and one to said sample buffer store and each adapted to multiply the signal stored in the respective memory stage or sample buffer store by a feedforward constant;

an analogue feedforward summer connected to receive the signals from the feedforward constants multipliers and sum these signals to derive an output signal;

control means responsive to said output signal for adjusting said variable; and timing control means comrising a time interval pulse generator and a memory store transfer pulse distributor responsive thereto, said time interval pulse generator serving to establish the sampling interval of the controller and the memory store transfer pulse distributor serving to provide command pulses to the sample buffer store and to the plurality of memory stages whereby during each sampling interval to cause the sample buffer store to sample and hold the sampled value of the signal from the analogue input summing circuit, subsequently to enable an output circuit to provide said output signal to said control means, and subsequently to transfer the signal stored in each of said memory stages into the next succeeding stage with the signal stored in the sample buffer store finally being transferred into the first memory stage.

10. A sampled data analogue controller according to claim 9 wherein the time interval pulse generator of the timing control means is such as to enable continuous variation of the sampling interval within a predetermined time range.

11. A sampled data analogue controller according to claim 10 wherein an analogue filter is provided to suppress components of the error signal at the data sampling frequency as set by the tie interval pulse generator, and the cut-off frequency of the analogue filter is arranged to be variable with the sampling interval.

12. A sampled data analogue controller according to claim 9 wherein the output circuit includes means to convert the analogue output signal into a pulse width modulated signal.

13. A sampled data analogue controller according to claim 12 wherein, for converting the analogue output signal into a pulse width modulated signal, the output of the feedforward summer is connected to the input of an integrating circuit for the duration of an enable output command pulse from the pulse distributor whereby the output of the integrating circuit ramps substantially linearly to a level dependent upon the amplitude of the feedforward summer output signal, and, at the termination of this period, a constant voltage the polarity of which is dependent upon the output polarity of the integrator is applied to the integrator input to cause the integrator output to ramp linearly from the previously reached positive or negative level towards a base reference level, the time taken for ramping back to said base reference level defining the output pulse width.

14. A sampled data analogue controller according to claim 13 wherein the output of the integrating circuit is coupled to a high-gain amplifier adapted to provide a saturated output when the integrator output exceeds a predetermined low level, and a polarity detector circuit is connected to receive the saturated amplifier output and according to its polarity to apply an appropriate constant voltage to the input of the integrating circuit to cause its output to ramp back to the said base reference level, means being provided for inhibiting the application of said voltage from the polarity detector to the input of the integrating circuit during the period of said enable output command pulse.

15. A sampled data analogue controller according to claim 12 wherein the integrating circuit is constructed as a track and ramp integrator.

16. A sampled data analogue controller according to claim 9 wherein a detector circuit is provided responsive to excursions of the analogue error signal beyond normal operational levels for causing the controller to enter a so-called FREEZE mode in which no output change demands are made on the controller and the analogue signals in the sample buffer store and the memory stages are all set to zero.

17. A sampled data analogue controller according to claim 9 wherein the time interval pulse generator comprises a multivibrator coupled to a binary divider chain, the pulse repetition frequency of the multivibrator being continuously adjustable and the division ratio of the binary divider chain being selectable to enable continuous variation of the sampling interval within a predetermined range, and the transfer pulse distributor comprises a free-running pulse generator the output of which is arranged to be enabled at the initiation of each time interval pulse, a binary coded decimal counter arranged to receive pulses from the pulse generator, and a binary-coded-decimal to decimal decoder coupled to the binary coded decimal counter to produce sequential output pulses on separate lines.

18. In a sampled data controller comprising an algorithm unit adapted to compute the expression $$Eo(z)/Ei(z) = (a_o \pm a_1 z^{-1} \pm a_2 z^{-2} \pm \ldots \pm a_n z^{-n})/(1 \pm b_1 z^{-1} \pm b_2 z^{-2} \pm \ldots \pm b_n z^{-n})$$

where $a_o, a_1, \ldots a_n$ and $b_1, \ldots b_n$ are constants appropriate to the circumstances of the variable to be controlled, $z^{-1}$ is the $z$ transform operator of delays, and $E_i(z)$ are the input and output signals of the algorithm unit respectively, signal input facilities for deriving an input signal $E_i(z)$ representative of the deviation of a controlled variable from a desired value and applying it to the algorithm unit to be sampled and processed therein, and signal output facilities responsive to the output signal $Eo(z)$ of the algorithm unit produced as the result of the application of the input $Ei(z)$ thereto for deriving a control signal for application to control means to reduce said deviation of the controlled variable from said desired value, the improvement comprising means for enabling continuous adjustment of the input signal sampling rate within a predetermined range.

19. In a sampled data controller according to claim 18, filter means for suppressing input signal components at the sampling frequency, the cut off frequency of such filter means being adjustable with the sampling rate.

20. In a sampled data controller comprising an algorithm unit adapted to realise the expression $$Eo(z)/Ei(z) = (a_o \pm a_1 z^{-1} \pm a_2 z^{-2} \pm \ldots \pm a_n z^{-n})/(1 \pm b_1 z^{-1} \pm b_2 z^{-2} \pm \ldots \pm b_n z^{-n})$$

where $a_o$, $a_1$, . . $a_n$ and $b_1$, . . $b_n$ are constants, appropriate to the circumstances of the variable to be controlled, $z^{-1}$ is the $z$ transform operator of delays, and $E_i(z)$ and $Eo(z)$ are the input and output signals of the algorithm unit respectively, signal input facilities for deriving an input signal $E_i(z)$ representative of the deviation of a controlled variable from a desired value and applying it to the algorithm unit to be sampled and processed therein, and signal output facilities responsive to the output signal $Eo(z)$ of the algorithm unit produced as the result of the application of the input $E_i(z)$ thereto for deriving a control signal for application to control means to reduce said deviation of the controlled variable from said desired value of claim 18, the improvement comprising means for converting the algorithm unit output signal $E_o(z)$ into a pulse width modulated signal for control purposes.

* * * * *